(12) United States Patent  
Johnson et al.

(10) Patent No.: US 12,554,055 B2  
(45) Date of Patent: Feb. 17, 2026

(54) REFLECTIVE POLARIZER, WINDSHIELD, INTEGRAL OPTICAL CONSTRUCTION AND METHOD FOR MAKING INTEGRAL OPTICAL CONSTRUCTION

(71) Applicant: 3M INNOVATIVE PROPERTIES COMPANY, St. Paul, MN (US)

(72) Inventors: Matthew B. Johnson, Woodbury, MN (US); Brianna N. Wheeler, Bloomington, MN (US); Martin J. Sisolak, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 716 days.

(21) Appl. No.: 17/887,611

(22) Filed: Aug. 15, 2022

(65) Prior Publication Data

US 2023/0058161 A1 Feb. 23, 2023

Related U.S. Application Data

(60) Provisional application No. 63/260,396, filed on Aug. 19, 2021.

(51) Int. Cl.
*G02B 5/30* (2006.01)
*B32B 17/10* (2006.01)
(Continued)

(52) U.S. Cl.
CPC ........ *G02B 5/305* (2013.01); *B32B 17/10192* (2013.01); *B32B 17/10458* (2013.01);
(Continued)

(58) Field of Classification Search
CPC ........ G02B 5/305; G02B 5/3058; G02B 5/28; G02B 5/281; G02B 5/282; G02B 5/285;
(Continued)

(56) References Cited

U.S. PATENT DOCUMENTS

2021/0302637 A1 9/2021 Haag et al.
2022/0019009 A1* 1/2022 Edwards ................. B32B 7/023
(Continued)

FOREIGN PATENT DOCUMENTS

WO 2019145860 A1 8/2019
WO 2020049424 A1 3/2020

*Primary Examiner* — Arnel C Lavarias
(74) *Attorney, Agent, or Firm* — Clifton F. Richardson

(57) ABSTRACT

A reflective polarizer includes a plurality of first layers disposed on a plurality of polymeric second layers. Each of at least 30% of the first layers includes at least 30% by weight of an inorganic material. For an incident light incident in a plane and a first incident angle, the reflective polarizer and the first layers have respective average optical reflectances R3v and R1v in a visible wavelength range and respective average optical reflectances R3ir and R1ir in an infrared wavelength range, R1v<R3v and (R1ir−R3ir)>10%, when the incident light is polarized along a first direction; and for the visible wavelength range and for a second incident angle, the plurality of polymeric second layers has an average optical reflectance R2v(x) when the plane includes the first direction and an average optical reflectance R2v(y) when the plane includes a second direction, 5%<R2v(y)<R2v(x)<60%.

16 Claims, 14 Drawing Sheets

(51) Int. Cl.
*B60J 1/02* (2006.01)
*B60J 3/06* (2006.01)
*B32B 27/08* (2006.01)
*B32B 27/30* (2006.01)
*B32B 27/36* (2006.01)

(52) U.S. Cl.
CPC . *B60J 1/02* (2013.01); *B60J 3/06* (2013.01); *G02B 5/3058* (2013.01); *B32B 27/08* (2013.01); *B32B 27/308* (2013.01); *B32B 27/36* (2013.01); *B32B 27/365* (2013.01); *B32B 2250/24* (2013.01); *B32B 2255/10* (2013.01); *B32B 2255/20* (2013.01); *B32B 2255/26* (2013.01); *B32B 2255/28* (2013.01); *B32B 2307/42* (2013.01); *B32B 2605/00* (2013.01)

(58) Field of Classification Search
CPC ........ G02B 5/287; G02B 5/30; G02B 5/3025; G02B 5/3033; G02B 5/3041; B32B 17/10192; B32B 17/10458; B32B 27/08; B32B 27/308; B32B 27/36; B32B 27/365; B32B 2250/24; B32B 2255/10; B32B 2255/20; B32B 2255/26; B32B 2255/28; B32B 2307/42; B32B 2605/00; B32B 17/10174; B32B 17/10201; B32B 17/10449; B60J 1/02; B60J 3/06
USPC ............ 359/485.01, 483.01, 485.03, 489.01, 359/489.07, 489.08, 489.11, 577, 580, 359/584, 585, 586, 588, 589, 590; 362/19; 353/20
See application file for complete search history.

(56) References Cited

U.S. PATENT DOCUMENTS

| | | |
|---|---|---|
| 2022/0050287 A1 | 2/2022 | Vanderlofske, III et al. |
| 2022/0146728 A1 | 5/2022 | Haag et al. |
| 2023/0341615 A1* | 10/2023 | Acharya .............. G02B 5/0242 |

* cited by examiner

REFLECTIVE POLARIZER, WINDSHIELD, INTEGRAL OPTICAL CONSTRUCTION AND METHOD FOR MAKING INTEGRAL OPTICAL CONSTRUCTION

TECHNICAL FIELD

The present disclosure relates to a reflective polarizer, a windshield including the reflective polarizer, an integral optical construction, and a method of making the integral optical construction.

BACKGROUND

A conventional multilayer reflective polarizer may be disposed on a windshield of a vehicle for use in various applications, such as heads-up displays (HUDs). Generally, the conventional multilayer reflective polarizer may be bonded to at least one surface of the windshield. One or more layers of the conventional multilayer reflective polarizer may delaminate from each other or from the at least one surface of the windshield.

SUMMARY

In a first aspect, the present disclosure provides a reflective polarizer. The reflective polarizer includes a plurality of first layers numbering N1 in total disposed on a plurality of polymeric second layers numbering N2 in total, wherein 2<N1<50, and (N2−N1)>10. Each of the first and polymeric second layers has an average thickness of less than about 500 nanometers (nm). Each of at least 30% of the first layers includes at least 30% by weight of an inorganic material. For an incident light incident in an incident plane, a visible wavelength range extending from about 420 nm to about 680 nm and an infrared wavelength range extending from about 850 nm to about 1100 nm, and for a first incident angle of less than about 10 degrees, the reflective polarizer and the plurality of first layers have respective average optical reflectances R3v and R1v in the visible wavelength range and respective average optical reflectances R3ir and R1ir in the infrared wavelength range, wherein R1v<R3v and (R1ir−R3ir)>10%, when the incident light is polarized along an in-plane first direction. Further, for the incident light incident in the incident plane, for the visible wavelength range, and for a second incident angle of greater than about 40 degrees, the plurality of polymeric second layers has an average optical reflectance R2v(x) when the incident plane includes the first direction and an average optical reflectance R2v(y) when the incident plane includes an in-plane second direction orthogonal to the first direction, wherein 5%<R2v(y)<R2v(x)<60%.

In a second aspect, the present disclosure provides a windshield of a vehicle including the reflective polarizer of the first aspect.

In a third aspect, the present disclosure provides an integral optical construction including a mesh disposed on an optical film. The optical film includes a plurality of polymeric first layers numbering M1 in total, wherein M1≥10. The mesh includes a plurality of traces connected to define a plurality of enclosed open areas therebetween. Each of the traces includes a plurality of alternating electrically conductive second and electrically insulative third layers numbering M2 in total, wherein 4≤M2<M1. Each of the first through third layers has an average thickness of less than about 500 nm. The mesh is electrically conductive along at least one direction across the integral optical construction.

In a fourth aspect, the present disclosure provides a method of making an integral optical construction. The method includes providing an integral optical film including a plurality of polymeric first layers numbering M1 in total, wherein M1≥10. Each of the first layers has an average thickness of less than about 500 nm. The method further includes sequentially coating a plurality of alternating electrically conductive second and electrically insulative third layers on the integral optical film The second and third layers number M2 in total, wherein 4≤M2<M1. Each of the second and third layers has an average thickness of less than about 500 nm. The method further includes selectively removing portions of at least some of the second and third layers to leave behind a mesh on the integral optical film. The mesh includes a plurality of traces connected to define a plurality of enclosed open areas therebetween. Each of the traces includes portions of the alternating electrically conductive second and electrically insulative third layers.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
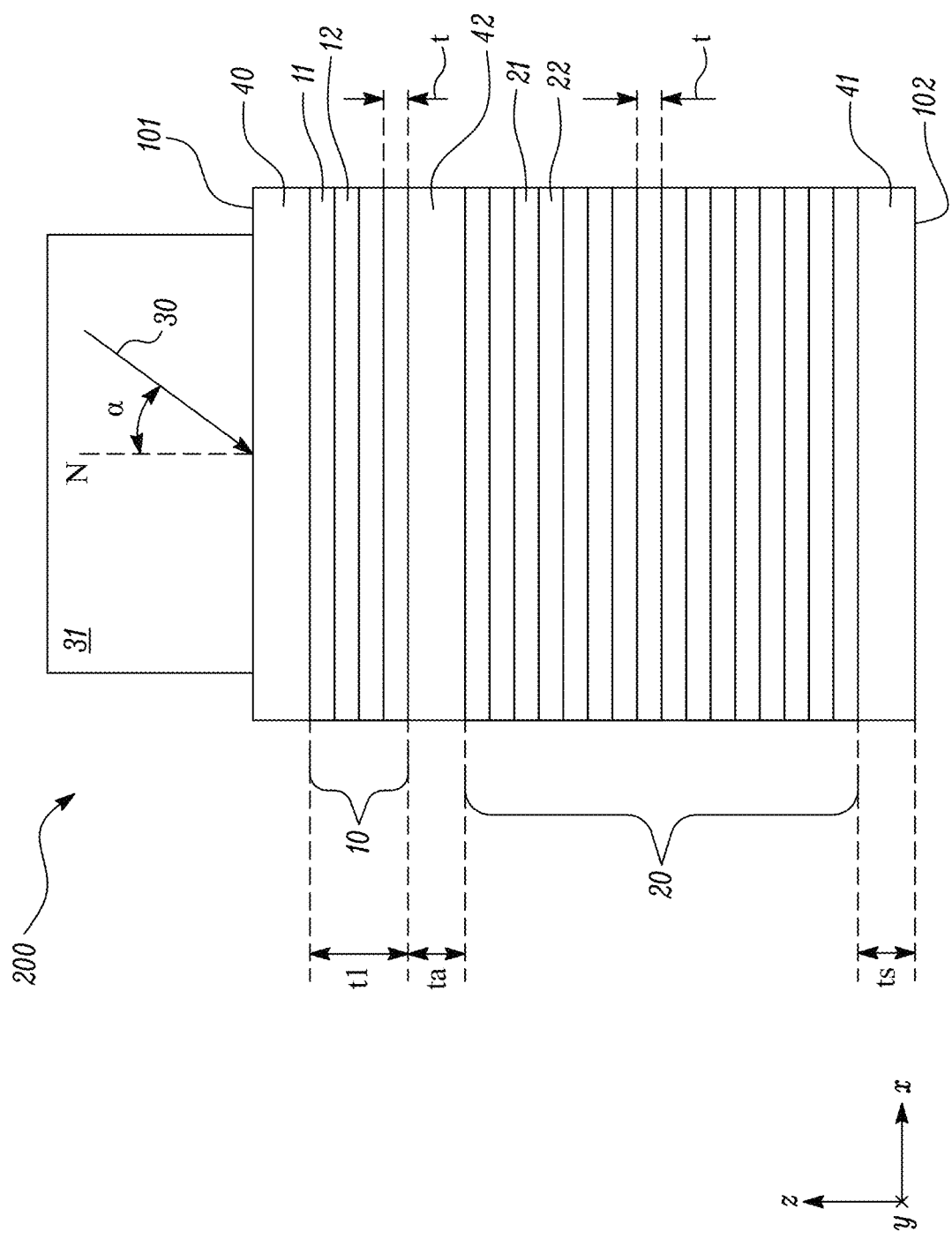
FIG. 1 illustrates a detailed schematic sectional view of a reflective polarizer, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, the term "from about", unless otherwise specifically defined, generally refers to an inclusive or a closed range. For example, if a parameter X is from about A to about B, then A≤X≤B.

As used herein, the term "film" generally refers to a material with a very high ratio of length or width to thickness. A film has two major surfaces defined by a length and width. Films typically have good flexibility and can be used for a wide variety of applications, including displays. Films may also be of suitable thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A given layer may be either partially or fully continuous as compared to adjacent layers or the film. A given layer may be partially or fully coextensive with adjacent layers. A given layer may contain sub-layers.

A heads-up display (HUD) may be used in a vehicle to present various information to a vehicle passenger on a windshield of the vehicle. The HUD may present information to the passenger without requiring the passenger to look away from surroundings of the vehicle that can be viewed through the windshield. HUDs are now increasingly used as a safety feature for vehicles, such as automobiles. Generally, a reflective polarizer is disposed adjacent to at least one substrate of the windshield. In some cases, the windshield is sandwiched between two substrates of the windshield. Typically, the reflective polarizer is bonded to the at least one substrate using bonding layers including adhesives, such as polyvinyl butyral (PVB).

The reflective polarizers disposed on the windshields may be configured to substantially block or reflect at least a portion of light in an infrared wavelength range, in order to reduce light in the infrared wavelength range passing or transmitting into an interior of the vehicle. This may, in turn, reduce heating up of one or more components of the HUD and/or the interior of the vehicle as the at least the portion of light in the infrared wavelength range is substantially blocked or reflected by the reflective polarizer. Conventional reflective polarizers that substantially block or reflect the at least the portion of light in the infrared wavelength range may include additional one or more optical stacks including alternating low index and high index polymeric layers configured to substantially block the at least the portion of light in the infrared wavelength. However, in some cases, the low index layers and the high index layers may delaminate from each other. In some cases, the low index layers or the high index layers of the conventional reflective polarizers may delaminate from the at least one substrate of the windshield. The delamination of the low index layers from the high index layers, or the delamination of the low index layers or the high index layers of the conventional reflective polarizers from the windshield may occur during cutting or handling of the reflective polarizer during or after manufacturing of the reflective polarizer. In some cases, the low index layers of the conventional reflective polarizers may include acrylic. The acrylic may react with the PVB and plasticize, and may lead to localized changes in thickness of the low index layers where the acrylic is plasticized. The localized changes in thickness may cause undesirable optical artifacts.

In an aspect, the present disclosure provides a reflective polarizer. The reflective polarizer includes a plurality of first layers numbering N1 in total disposed on a plurality of polymeric second layers numbering N2 in total, wherein $2<N1<50$, and $(N2-N1)>10$. Each of the first and polymeric second layers has an average thickness of less than about 500 nanometers (nm). Each of at least 30% of the first layers includes at least 30% by weight of an inorganic material. For an incident light incident in an incident plane, a visible wavelength range extending from about 420 nm to about 680 nm and an infrared wavelength range extending from about 850 nm to about 1100 nm, and for a first incident angle of less than about 10 degrees, the reflective polarizer and the plurality of first layers have respective average optical reflectances $R3v$ and $R1v$ in the visible wavelength range and respective average optical reflectances $R3ir$ and $R1ir$ in the infrared wavelength range, wherein $R1v<R3v$ and $(R1ir-R3ir)>10\%$, when the incident light is polarized along an in-plane first direction. Further, for the incident light incident in the incident plane, for the visible wavelength range, and for a second incident angle of greater than about 40 degrees, the plurality of polymeric second layers has an average optical reflectance $R2v(x)$ when the incident plane includes the first direction and an average optical reflectance $R2v(y)$ when the incident plane includes an in-plane second direction orthogonal to the first direction, wherein $5\%<R2v(y)<R2v(x)<60\%$.

The present disclosure further provides a windshield of a vehicle including the reflective polarizer. The reflective polarizer including at least 30% of the first layers that individually include at least 30% by weight of the inorganic material may provide the desired optical properties, such as substantial infrared rejection, while preventing the delamination which typically occurs in the conventional reflective polarizers. Specifically, inclusion of the inorganic material in at least 30% of the first layers may reduce a thickness of the plurality of first layers to less than about 50 microns, which may prevent delamination between the layers of the plurality of first layers during processing (e.g., manufacturing and/or installation) of the reflective polarizer. Further, the inclusion of the inorganic material in at least 30% of the first layers may prevent plasticization of one or more layers of the plurality of first layers as the plurality of first layers may not react with the PVB, thereby preventing undesirable optical artifacts. This may also ensure adequate adhesion of the plurality of first layers with the plurality of polymeric second layers, as well as adequate adhesion of the reflective polarizer with the windshield of the vehicle.

In some cases, the inorganic material may include electrically conductive materials thereby making the first layers including the inorganic material electrically conductive first layers. When the electrically conductive first layers are connected to a power source, the electrically conductive first layers may heat the windshield. Heating of the windshield may facilitate clearing of moisture, frost, snow, condensation, etc., that may be accumulated on the windshield for clear viewing through the windshield.

Referring now to figures, FIG. 1 illustrates a detailed schematic sectional view of a reflective polarizer 200, according to an embodiment of the present disclosure. The reflective polarizer 200 defines mutually orthogonal x-, y-, and z-axes. The x- and y-axes correspond to in-plane axes of the reflective polarizer 200, while the z-axis is a transverse axis disposed along a thickness of the reflective polarizer 200. In other words, the x- and y-axes are disposed along a plane (i.e., x-y plane) of the reflective polarizer 200, and the z-axis is perpendicular to the plane of the reflective polarizer 200. In some embodiments, the x- and y-axes correspond to in-plane first and second directions, respectively.

The reflective polarizer 200 includes a plurality of first layers 10 numbering N1 in total. N1 is greater than about 2 and less than about 50, i.e., $2<N1<50$. In some embodiments, the plurality of first layers 10 includes a plurality of alternating A-layers 11 and B-layers 12 numbering N1 in total. The plurality of first layers 10 may interchangeably be referred to as "the first layers 10".

Each of at least 30% of the first layers 10 includes at least 30% by weight of an inorganic material. In some embodiments, each of the at least 30% of the first layers 10 includes at least 40%, at least 50%, at least 60%, at least 70%, at least 80%, at least 90%, or at least 95% by weight of the inorganic material.

In some embodiments, each of at least 40%, at least 50%, at least 60%, at least 70%, at least 80%, or at least 90% of the first layers 10 includes the at least 30% by weight of the inorganic material. In some embodiments, each of the first layers 10, i.e., 100% of the first layers 10 includes the at least 30% by weight of the inorganic material. In some examples, each of the A-layers 11 of the plurality of first layers 10 includes the at least 30% by weight of the inorganic material. In such examples, about 50% of the first layers 10 may include the at least 30% by weight of the inorganic material.

In some embodiments, the inorganic material includes an electrically conductive material. In some embodiments, the electrically conductive material includes one or more of a metal and a metal oxide. In some embodiments, the metal includes one or more of silver, gold, titanium, chromium, and aluminum. In some embodiments, the metal oxide includes one or more of zinc oxide, aluminum zinc oxide (AZO), indium zinc oxide (IZO), titanium oxide, titanium dioxide ($TiO_2$), and indium tin oxide (ITO). In some embodiments, each of the A-layers 11, but none of the B-layers 12, is electrically conductive along at least one in-plane direction (e.g., the first or second directions) of the A-layer 11.

In some embodiments, the inorganic material includes one or more of a dielectric material and a dielectric oxide material. In some embodiments, the dielectric material includes one or more of silicon nitride, silicon carbide (SiC), silicon carbonitride (SiCN), and silicon oxy-carbonitride (SiOCN). In some embodiments, the dielectric oxide material includes one or more of silicon dioxide ($SiO_2$), aluminum oxide ($Al_2O_3$), zirconium dioxide ($ZrO_2$), niobium pentoxide ($Nb_2O_5$), titanium dioxide, and magnesium fluoride ($MgF_2$).

In some embodiments, each of the B-layers 12 includes a cross-linked polymer. In some embodiments, the cross-linked polymer is acrylic.

Figure 6C:
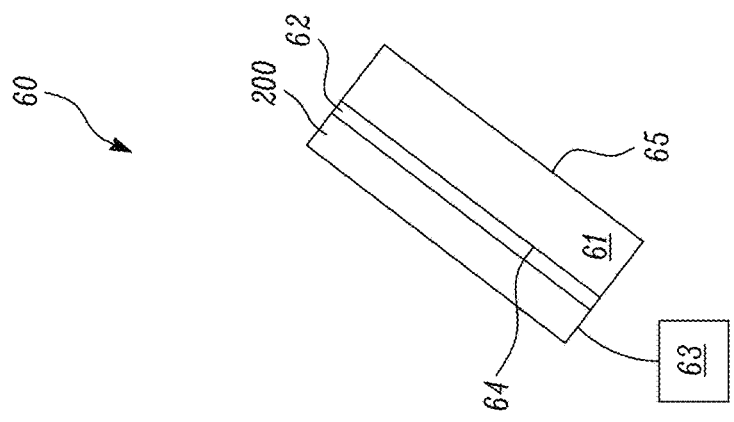
FIG. 6C illustrates a detailed schematic sectional view of a portion of the windshield of the vehicle of FIG. 6A including the reflective polarizer of FIG. 1, according to another embodiment of the present disclosure.
Figure 6B:
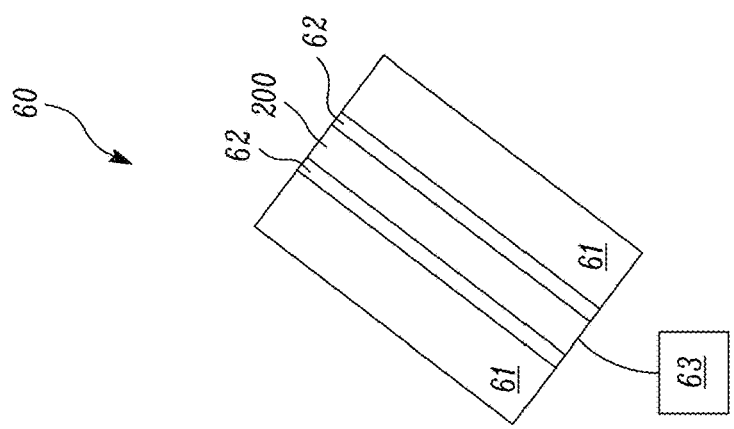
FIG. 6B illustrates a detailed schematic sectional view of a portion of the windshield of the vehicle of FIG. 6A including the reflective polarizer of FIG. 1, according to an embodiment of the present disclosure.
Figure 6A:
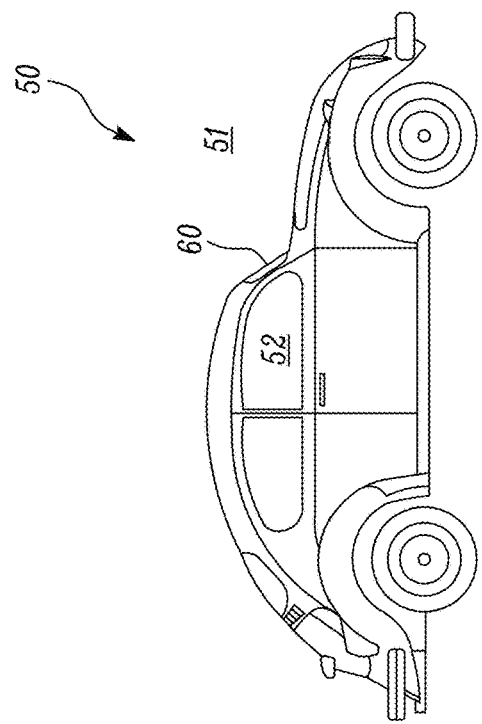
FIG. 6A illustrates a schematic side view of an example of a vehicle including a windshield.

In some cases, the reflective polarizer 200 may be used in windshields of vehicles (such as a windshield 60 of a vehicle 50 shown in FIG. 6A). Specifically, the reflective polarizer 200 may be bonded to an inner surface of a substrate (e.g., at least one substrate 61 shown in FIG. 6C) or may be sandwiched between substrates (e.g., a pair of substrates 61 shown in FIG. 6B). The reflective polarizer 200 including the at least 30% by weight of the inorganic material in the at least 30% of the first layers 10 may show less reactivity with adhesives, such as polyvinyl butyral (PVB), acrylic, polyurethane etc., which may prevent undesirable optical artifacts due to plasticization of a material of the first layers 10 with the adhesives.

The plurality of first layers 10 is disposed on a plurality of polymeric second layers 20. The plurality of polymeric second layers 20 may interchangeably be referred to as "the polymeric second layers 20". In some embodiments, the first layers 10 are coated on the polymeric second layers 20. In some embodiments, the first layers 10 are coated on the polymeric second layers 20 by one or more of a spin coating process, a knife coating process, a spray coating process, a dip coating process, a slit coating process, a die coating process, a vacuum coating process, a vapor deposition process, a physical vapor deposition process, a chemical vapor deposition (CVD) process, a plasm-enhanced chemical vapor deposition (PECVD) process, a low pressure chemical vapor deposition (LPCVD) process, a sputtering process, and an electron beam vapor deposition process.

Since the first layers 10 may be coated on the polymeric second layers 20, the plurality of first layers 10 may have a lower thickness as compared to a conventional polymeric multilayer reflective polarizer.

The plurality of polymeric second layers 20 number N2 in total. In some embodiments, the plurality of polymeric second layers 20 includes a plurality of alternating polymeric C-layers 21 and polymeric D-layers 22 numbering N2 in total. A difference between N2 and N1 is greater than about 10, i.e., (N2−N1)>10. In some embodiments, the reflective polarizer 200 includes opposing first and second major surfaces 101, 102. In some embodiments, the pluralities of first and polymeric second layers 10, 20 may include the first and second major surfaces 101, 102, respectively.

Each of the first and polymeric second layers 10, 20 has an average thickness t. In other words, each of the A-layers, B-layers, polymeric C-layers, and polymeric D-layers 11, 12, 21, 22 (A- through D-layers 11, 12, 21, 22) has the average thickness t. Each of the A- through D-layers 11, 12, 21, 22 defines the average thickness t along the z-axis. The term "average thickness t", as used herein, refers to an average thickness along a plane (i.e., the x-y plane) of each of the A-through D-layers 11, 12, 21, 22. In some embodiments, each of the A- through D-layers 11, 12, 21, 22 has the average thickness t of less than about 500 nanometers (nm). In some embodiments, each of the A- through D-layers 11, 12, 21, 22 has the average thickness t of less than about 400 nm, less than about 300 nm, or less than about 200 nm.

The plurality of first layers 10 has an average thickness t1. The plurality of first layers 10 defines the average thickness t1 along the z-axis. The term "average thickness t1", as used herein, refers to a sum of the average thicknesses t of the A- and B-layers 11, 12 of the plurality of first layers 10. In some embodiments, the average thickness t1 of the plurality of first layers 10 is less than about 50 microns. In some embodiments, the average thickness t1 of the plurality of first layers 10 is less than about 40 microns, less than about 30 microns, less than about 20 microns, or less than about 10 microns. The reflective polarizer 200 including the at least 30% by weight of the inorganic material in the at least 30% of the first layers 10, where the average thickness t1 of the plurality of first layers 10 is less than about 50 microns, may reduce a likelihood of delamination between the A- and B-layers 11, 12 of the reflective polarizer 200, and delamination between the reflective polarizer 200 and the windshield (shown in FIG. 6A).

In some embodiments, the plurality of first layers 10 disposed on the plurality of polymeric second layers 20, in combination, are disposed between a pair of skin layers 40, 41. In some embodiments, the skin layers 40, 41 may include the first and second major surfaces 101, 102, respectively. Each of the skin layers 40, 41 has an average thickness ts along the z-axis. The term "average thickness ts", as used herein, refers to an average thickness along a plane (i.e., the x-y plane) of each of the skin layers 40, 41. In some embodiments, each of the skin layers 40, 41 has the average thickness ts of greater than about 500 nm. In some embodiments, each of the skin layers 40, 41 has the average thickness ts of greater than about 750 nm, greater than about 1000 nm, greater than about 1250 nm, or greater than about 1500 nm.

In some embodiments, at least one of the pair of skin layers 40, 41 may include one or more polymeric materials, for example, poly-hexyl-ethylene naphthalate (PHEN), polyethylene naphthalate (PEN), copolymers containing PHEN, PEN and/or other polyesters (e.g., polyethylene terephthalate (PET), or polyesters containing dibenzoic acid), glycol modified polyethylene terephthalate (PETg), polycarbonate (PC), poly (methyl methacrylate) (PMMA), or blends of these classes of materials.

In some embodiments, the reflective polarizer 200 further includes at least one auxiliary layer 42 disposed between the pluralities of first and polymeric second layers 10, 20. The at least one auxiliary layer 42 has an average thickness ta. The term "average thickness ta", as used herein, refers to an average thickness along a plane (i.e., the x-y plane) of the at least one auxiliary layer 42. In some embodiments, the at least one auxiliary layer 42 has the average thickness ta of greater than about 500 nm. In some embodiments, the at least one auxiliary layer 42 has the average thickness ta of greater than about 750 nm, greater than about 1000 nm, greater than about 1250 nm, or greater than about 1500 nm. In the illustrated embodiment of FIG. 1, the reflective polarizer 200 includes one auxiliary layer 42 disposed between the pluralities of first and polymeric second layers 10, 20.

In some embodiments, the at least one auxiliary layer 42 may include one or more polymeric materials, for example, PHEN, PEN, copolymers containing PHEN, PEN and/or other polyesters (e.g., PET or polyesters containing dibenzoic acid), PETg, PC, PMMA, polyurethane, or blends of these classes of materials. In some embodiments, the at least one auxiliary layer 42 may be substantially similar to at least one of the pair of skin layers 40, 41.

In some embodiments, the pair of skin layers 40, 41 and the auxiliary layer 42 may be included in the reflective polarizer 200 in the form of coatings, which may be co-extensively stretched during manufacture of the reflective polarizer 200. In some embodiments, the pair of skin layers 40, 41 and the auxiliary layer 42 may provide improved adhesion to subsequent layers (e.g., adhesive layers including PVB, acrylic, polyurethane, etc.).

In some embodiments, the plurality of first layers 10, the plurality of polymeric second layers 20, the pair of skin layers 40, 41, and the at least one auxiliary layer 42 are disposed along the z-axis of the reflective polarizer 200 and may be substantially co-extensive with each other, or have substantially similar in-plane dimensions (i.e., length and width). In other words, the plurality of first layers 10, the plurality of polymeric second layers 20, the pair of skin layers 40, 41, and the at least one auxiliary layer 42 may be substantially co-extensive with each other in the x-y plane.

FIG. 1 further illustrates an incident light 30 propagating in an incident plane 31 and incident on the reflective polarizer 200. The incident plane 31 may include a normal N to the reflective polarizer 200. The normal N is substantially orthogonal to the plane (i.e., the x-y plane) of the reflective polarizer 200. In other words, the normal N is substantially along the z-axis of the reflective polarizer 200. In some embodiments, the incident light 30 is incident on the reflective polarizer 200 at the first major surface 101 of the reflective polarizer 200. In other words, the incident light 30 is incident on the reflective polarizer 200 from a side of the plurality of first layers 10. The incident light 30 is incident on the reflective polarizer 200 at an incident angle $\alpha$ with respect to the normal N.

In some embodiments, the incident angle $\alpha$ is a first incident angle $\alpha 1$ of less than about 10 degrees with respect to the normal N to the reflective polarizer 200. In other words, the incident light 30 is incident on the reflective polarizer 200 at the first incident angle $\alpha 1$ of less than about 10 degrees with respect to the normal N to the reflective polarizer 200. In some embodiments, the first incident angle $\alpha 1$ is less than about 8 degrees, less than about 6 degrees, less than about 4 degrees, or less than about 2 degrees with respect to the normal N to the reflective polarizer 200. In some embodiments, the incident angle $\alpha$ is a second incident angle $\alpha 2$ of greater than about 40 degrees with respect to the normal N to the reflective polarizer 200. In other words, the incident light 30 is incident on the reflective polarizer 200 at the second incident angle $\alpha 2$ of greater than about 40 degrees with respect to the normal N to the reflective polarizer 200. In some embodiments, the second incident angle $\alpha 2$ is greater than about 45 degrees, greater than about 50 degrees, or greater than about 55 degrees with respect to the normal N to the reflective polarizer 200. In some embodiments, the first and second incident angles $\alpha 1$, $\alpha 2$ are about 8 degrees and about 60 degrees, respectively. In some other embodiments, the second incident angle $\alpha 2$ is about 40 degrees. In yet other embodiments, the second incident angle $\alpha 2$ is about 45 degrees.

In some embodiments, the incident plane 31 includes the first direction. In such embodiments, the incident plane 31 is substantially along the x-z plane of the reflective polarizer 200. In some embodiments, the x-axis may be a block axis of the reflective polarizer 200.

In some embodiments, the incident plane 31 includes the second direction orthogonal to the first direction. In such embodiments, the incident plane 31 is substantially along the y-z plane (not shown) of the reflective polarizer 200. In some embodiments, the y-axis may be a pass axis of the reflective polarizer 200. In the illustrated embodiment of FIG. 1, the incident plane 31 is substantially along the x-z plane of the reflective polarizer 200 and includes the first direction along the x-axis.

Figure 2A:
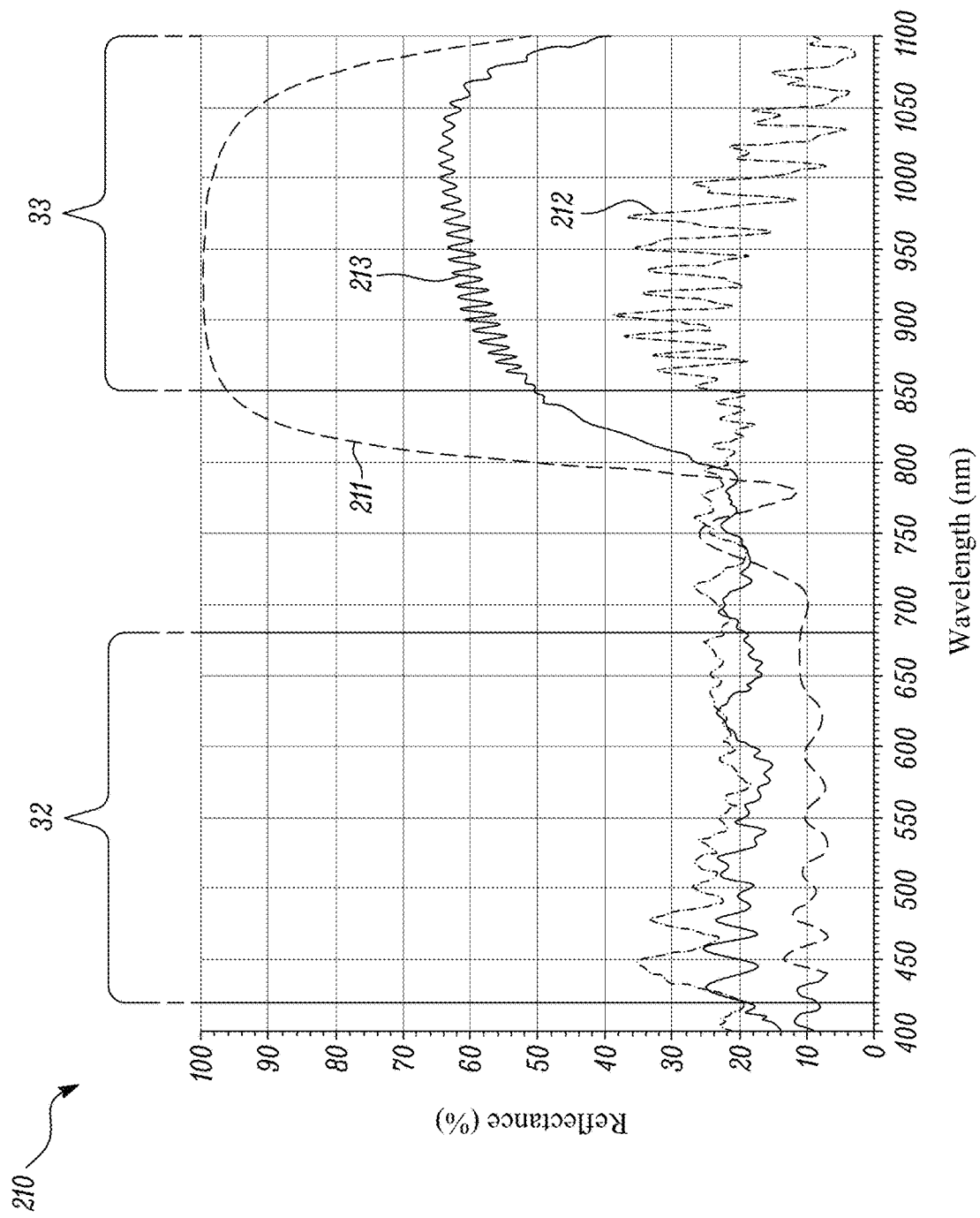
FIG. 2A illustrates a plot depicting respective optical reflectances versus wavelength of a plurality of first layers, a plurality of polymeric second layers, and the reflective polarizer of FIG. 1, for an incident light polarized along an in-plane first direction and for a first incident angle, according to an embodiment of the present disclosure.

FIG. 2A illustrates a plot 210 depicting respective optical reflectances versus wavelength of the plurality of first layers 10 (shown in FIG. 1), the plurality of polymeric second layers 20 (shown in FIG. 1), and the reflective polarizer 200 (shown in FIG. 1), for the incident light 30 (shown in FIG. 1) polarized along the first direction and incident at the first incident angle $\alpha 1$ of less than about 10 degrees. Wavelength is expressed in nanometers (nm) in the abscissa. Optical reflectance is expressed as a reflectance percentage in the left ordinate axis.

The plot 210 includes a curve 211 depicting the optical reflectance versus wavelength of the plurality of first layers 10, a curve 212 depicting the optical reflectance versus wavelength of the plurality of polymeric second layers 20, and a curve 213 depicting the optical reflectance versus wavelength of the reflective polarizer 200, for the incident light 30 incident in the incident plane 31, polarized along the first direction, and incident at the first incident angle $\alpha 1$ of less than about 10 degrees.

Referring to the curves 211, 213, for the incident light 30 incident in the incident plane 31, a visible wavelength range 32 extending from about 420 nm to about 680 nm and an infrared wavelength range 33 extending from about 850 nm to about 1100 nm, and for the first incident angle $\alpha 1$ of less than about 10 degrees, the reflective polarizer 200 and the plurality of first layers 10 have respective average optical reflectances R3$v$ and R1$v$ in the visible wavelength range 32 when the incident light 30 is polarized along the first direction. The average optical reflectance R1$v$ is less than the average optical reflectance R3$v$, i.e., R1$v$<R3$v$.

In some embodiments, the visible wavelength range 32 may extend from about 390 nm to about 730 nm and the infrared wavelength range 33 may extend from about 850 nm to about 1500 nm.

In some embodiments, the average optical reflectance R1$v$ is less than the average optical reflectance R3$v$ by at least 2.5%. In other words, a difference between the average optical reflectance R3$v$ and the average optical reflectance R1$v$ is greater than or equal to about 2.5%, i.e., (R3$v$−R1$v$) ≥2.5%. In some embodiments, the average optical reflectance R1$v$ is less than the average optical reflectance R3$v$ by at least 5%, at least 7.5%, at least 9%, or at least 10%. In some examples, the first incident angle $\alpha 1$ is about 8 degrees, the average optical reflectance R1$v$ is about 9.3%, the average optical reflectance R3$v$ is about 19.5%, and the average optical reflectance R1$v$ is less than the average optical reflectance R3$v$ by about 10.2%.

Therefore, for the incident light 30 incident in the incident plane 31, for the visible wavelength range 32, and for the first incident angle $\alpha 1$ of less than about 10 degrees, the average optical reflectance R3$v$ of the reflective polarizer 200 is greater than the average optical reflectance R1$v$ of the plurality of first layers 10, when the incident light 30 is polarized along the first direction.

With continued reference to the curves 211, 213, for the incident light 30 incident in the incident plane 31 and for the first incident angle $\alpha 1$ of less than about 10 degrees, the reflective polarizer 200 and the plurality of first layers 10 have respective average optical reflectances R3$ir$ and R1$ir$ in the infrared wavelength range 33, when the incident light 30 is polarized along the first direction. A difference between the average optical reflectance R1$ir$ and the average optical reflectance R3$ir$ is greater than about 10%, i.e., (R1$ir$−R3$ir$) >10%. In some embodiments, (R1$ir$−R3$ir$)>15%, (R1$ir$−R3$ir$)>20%, (R1$ir$−R3$ir$)>25%, (R1$ir$−R3$ir$)>30%, or (R1$ir$−R3$ir$)>32.5%.

In some examples, the first incident angle α1 is about 8 degrees, the average optical reflectance R3ir is about 58.8%, the average optical reflectance R1ir is about 93.5%, and (R1ir−R3ir) is about 34.7%.

Therefore, for the incident light 30 incident in the incident plane 31, for the infrared wavelength range 33, and for the first incident angle α1 of less than about 10 degrees, the average optical reflectance R1v of the plurality of first layers 10 is greater than the average optical reflectance R3v of the reflective polarizer 200, when the incident light 30 is polarized along the first direction.

Referring now to the curve 212, for the incident light 30 incident in the incident plane 31 and for the first incident angle α1 of less than about 10 degrees, the plurality of polymeric second layers 20 has an average optical reflectance R2v in the visible wavelength range 32 and an average optical reflectance R2ir in the infrared wavelength range 33, when the incident light 30 is polarized along the first direction. For the incident light 30 incident in the incident plane 31 and for the first incident angle α1 of less than about 10 degrees, the average optical reflectance R2v of the plurality of second layers 20 may be greater than each of the average optical reflectances R1v, R3v of the plurality of first layers 10 and the reflective polarizer 200, respectively, when the incident light 30 is polarized along the first direction. However, for the incident light 30 incident in the incident plane 31 and for the first incident angle α1 of less than about 10 degrees, the average optical reflectance R2ir of the plurality of second layers 20 is less than each of the average optical reflectances R1ir, R3ir of the plurality of first layers 10 and the reflective polarizer 200, respectively, when the incident light 30 is polarized along the first direction.

In some examples, the first incident angle α1 is about 8 degrees, the average optical reflectance R2v is about 24.2%, and the average optical reflectance R2ir is about 19.7%.

It is apparent from the plot 210 that the average optical reflectance R3ir is greater than the average optical reflectance R3v. Therefore, for the incident light 30 incident in the incident plane 31 and for the first incident angle α1 of less than about 10 degrees, the reflective polarizer 200 has the average optical reflectance R3ir in the infrared wavelength range 33 greater than the average optical reflectance R3v in the visible wavelength range 32, when the incident light 30 is polarized along the first direction.

Figure 2B:
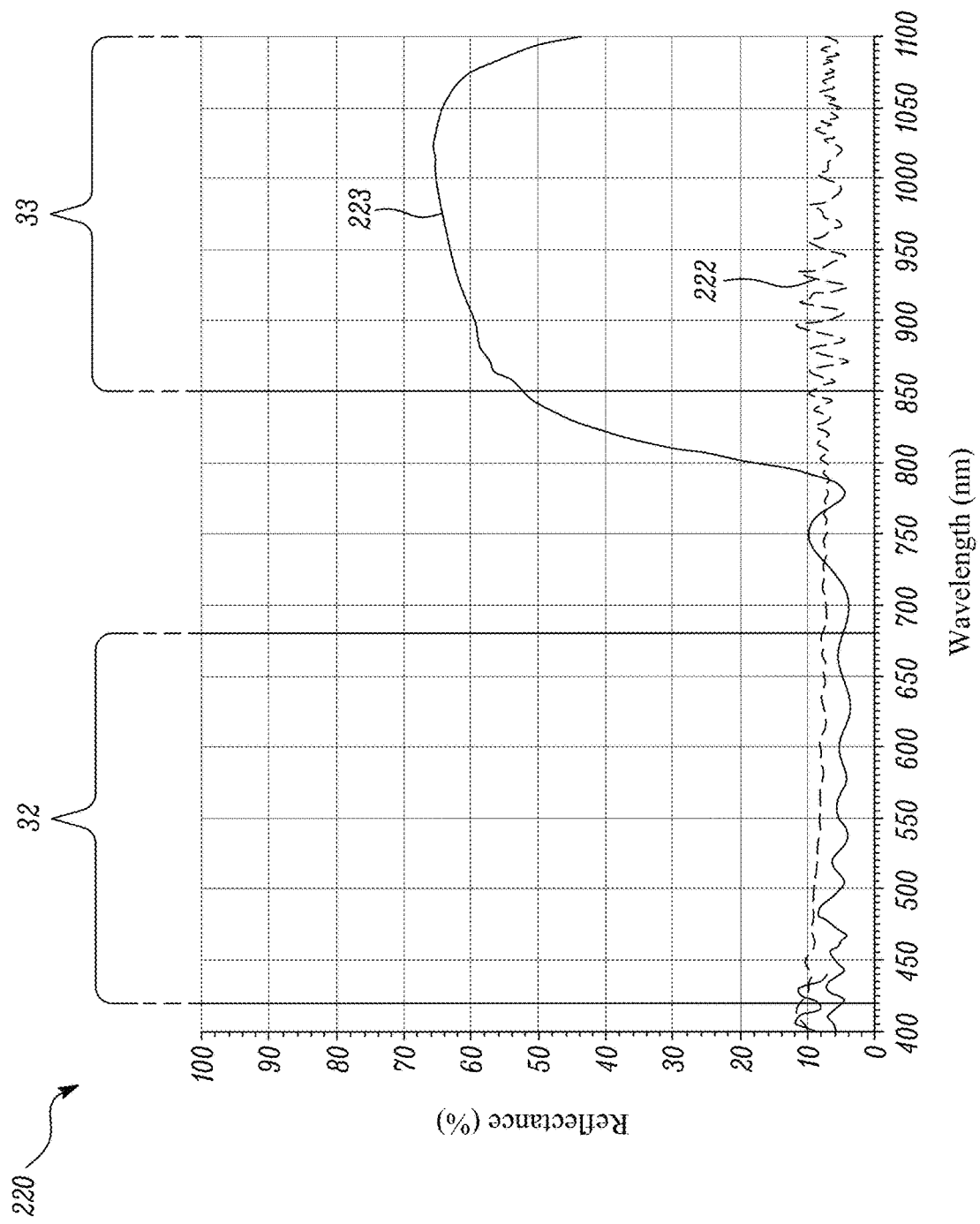
FIG. 2B illustrates a plot depicting respective optical reflectances versus wavelength of the plurality of polymeric second layers and the reflective polarizer of FIG. 1, for the incident light polarized along an in-plane second direction and for the first incident angle, according to an embodiment of the present disclosure.

FIG. 2B illustrates a plot 220 depicting respective optical reflectances versus wavelength of the plurality of polymeric second layers 20 (shown in FIG. 1) and the reflective polarizer 200 (shown in FIG. 1), for the incident light 30 (shown in FIG. 1) incident in the incident plane 31 (shown in FIG. 1) and incident at the first incident angle α1 of less than about 10 degrees, when the incident light 30 is polarized along the second direction. Wavelength is expressed in nanometers (nm) in the abscissa. Optical reflectance is expressed as a reflectance percentage in the left ordinate axis.

The plot 220 includes a curve 222 depicting the optical reflectance versus wavelength of the plurality of polymeric second layers 20 and a curve 223 depicting the optical reflectance versus wavelength of the reflective polarizer 200, for the incident light 30 incident in the incident plane 31 and incident at the first incident angle α1 of less than about 10 degrees, when the incident light 30 is polarized along the second direction.

Referring to the curves 222, 223, for the incident light 30 incident in the incident plane 31 and for the first incident angle α1 of less than about 10 degrees, the plurality of polymeric second layers 20 and the reflective polarizer 200 have respective average optical reflectances R2v(s) and R3v(s) in the visible wavelength range 32, and respective average optical reflectances R2ir(s) and R3ir(s) in the infrared wavelength range 33, when the incident light 30 is polarized along the second direction.

For the incident light 30 incident in the incident plane 31 and for the first incident angle α1 of less than about 10 degrees, the plurality of polymeric second layers 20 substantially transmits the incident light 30 in the visible wavelength range 32 and in the infrared wavelength range 33, when the incident light 30 is polarized along the second direction.

Further, for the incident light 30 incident in the incident plane 31 and for the first incident angle α1 of less than about 10 degrees, the reflective polarizer 200 substantially transmits the incident light 30 in the visible wavelength range 32 and substantially blocks the incident light 30 in the infrared wavelength range 33, when the incident light 30 is polarized along the second direction.

Therefore, for the incident light 30 incident in the incident plane 31 and for the first incident angle α1 of less than about 10 degrees, the plurality of polymeric second layers 20 has the average optical reflectance R2ir(s) less than the average optical reflectance R3ir(s) of the reflective polarizer 200 in the infrared wavelength range 33, when the incident light 30 is polarized along the second direction.

In some examples, the first incident angle α1 is about 8 degrees, the average optical reflectance R2v(s) is about 8.3%, the average optical reflectance R3v(s) is about 5.2%, the average optical reflectance R2ir(s) is about 6.9%, and the average optical reflectance R3ir(s) is about 60.8%.

In some embodiments, for the incident light 30 incident in the incident plane 31 and for the first incident angle α1 of less than about 10 degrees, the plurality of first layers 10 may have the average optical reflectance R1ir, when the incident light 30 is polarized along the second direction. Therefore, in some embodiments, for the incident light 30 incident in the incident plane 31 and for the first incident angle α1 of less than about 10 degrees, the plurality of first layers 10 may substantially block the incident light 30 in the infrared wavelength range 33 irrespective of a polarization state of the incident light 30.

From the plots 210, 220 shown in FIGS. 2A and 2B, respectively, it can be observed that for the incident light 30 incident in the incident plane 31 and for the first incident angle α1 of less than about 10 degrees, the average optical reflectance R2v of the plurality of second layers 20 in the visible wavelength range 32, when the incident light 30 is polarized along the first direction, is greater than the average optical reflectance R2v(s) of the plurality of second layers 20 in the visible wavelength range 32, when the incident light 30 is polarized along the second direction. Therefore, the plurality of second layers 20 may be polarization sensitive in the visible wavelength range 32.

Further, for the incident light 30 incident in the incident plane 31 and for the first incident angle α1 of less than about 10 degrees, the reflective polarizer 200 substantially blocks the incident light 30 in the infrared wavelength range 33, when the incident light 30 is polarized along each of the first and second directions. Therefore, for the incident light 30 incident in the incident plane 31 and for the first incident angle α1 of less than about 10 degrees, the reflective polarizer 200 may substantially block the incident light 30 in the infrared wavelength range 33 irrespective of the polarization state of the incident light 30.

Further, for the incident light 30 incident in the incident plane 31 and for the first incident angle α1 of less than about 10 degrees, the average optical reflectance R3ν of the reflective polarizer 200 in the visible wavelength range 32, when the incident light 30 is polarized along the first direction, is greater than the average optical reflectance R3ν(s) of the reflective polarizer 200 in the visible wavelength range 32, when the incident light 30 is polarized along the second direction. Therefore, the reflective polarizer 200 may be polarization sensitive in the visible wavelength range 32.

Figure 3A:
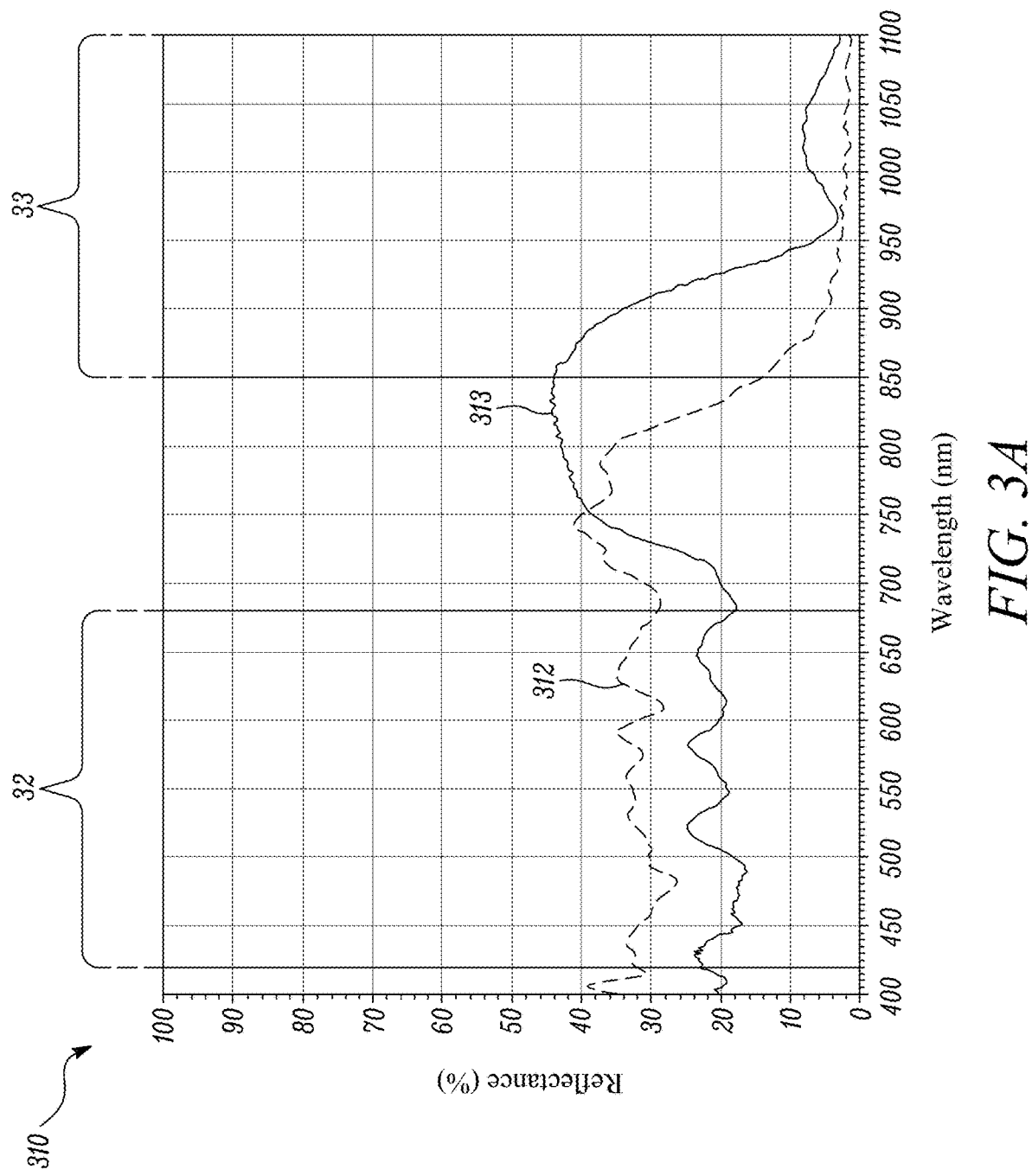
FIG. 3A illustrates a plot depicting respective optical reflectances versus wavelength of the plurality of polymeric second layers and the reflective polarizer of FIG. 1, for the incident light polarized along the first direction and for a second incident angle, according to an embodiment of the present disclosure.

FIG. 3A illustrates a plot 310 depicting respective optical reflectances versus wavelength of the plurality of polymeric second layers 20 (shown in FIG. 1) and the reflective polarizer 200 (shown in FIG. 1), for the incident light 30 (shown in FIG. 1) incident in the incident plane 31 (shown in FIG. 1) and incident at the second incident angle α2 of greater than about 40 degrees, when the incident plane 31 includes the first direction. Wavelength is expressed in nanometers (nm) in the abscissa. Optical reflectance is expressed as a reflectance percentage in the left ordinate axis.

The plot 310 includes a curve 312 depicting the optical reflectance versus wavelength of the plurality of polymeric second layers 20 and a curve 313 depicting the optical reflectance versus wavelength of the reflective polarizer 200, for the incident light 30 incident in the incident plane 31 and incident at the second incident angle α2 of greater than about 40 degrees, when the incident plane 31 includes the first direction.

Referring to the curve 312, for the incident light 30 incident in the incident plane 31, for the visible wavelength range 32, and for the second incident angle α2 of greater than about 40 degrees, the plurality of polymeric second layers 20 has an average optical reflectance of R2ν(x), when the incident plane 31 includes the first direction.

In some examples, the second incident angle α2 is about 60 degrees and the average optical reflectance R2ν(x) is about 31.6%.

With continued reference to the curve 312, for the incident light 30 incident in the incident plane 31, for the infrared wavelength range 33, and for the second incident angle α2 of greater than about 40 degrees, the plurality of polymeric second layers 20 has an average optical reflectance of R2ir(x), when the incident plane 31 includes the first direction.

In some examples, the second incident angle α2 is about 60 degrees and the average optical reflectance R2ir(x) is about 3.9%.

Referring to the curve 313, for the incident light 30 incident in the incident plane 31, for the visible wavelength range 32, and for the second incident angle α2 of greater than about 40 degrees, the reflective polarizer 200 has an average optical reflectance of R3ν(x), when the incident plane 31 includes the first direction.

In some examples, the second incident angle α2 is about 60 degrees and the average optical reflectance R3ν(x) is about 20.7%.

With continued reference to the curve 313, for the incident light 30 incident in the incident plane 31, for the infrared wavelength range 33, and for the second incident angle α2 of greater than about 40 degrees, the reflective polarizer 200 has an average optical reflectance of R3ir(x), when the incident plane 31 includes the first direction.

In some examples, the second incident angle α2 is about 60 degrees and the average optical reflectance R3ir(x) is about 15.8%.

Referring to the curve 213 (shown in FIG. 2A) and the curve 313, it can be observed that, for the incident light 30 incident in the incident plane 31 including the first direction, the reflective polarizer 200 blocks a greater portion of the incident light 30 in the infrared wavelength range 33 when the incident light 30 is incident at the first incident angle α1 than when the incident light 30 is incident at the second incident angle α2.

Figure 3B:
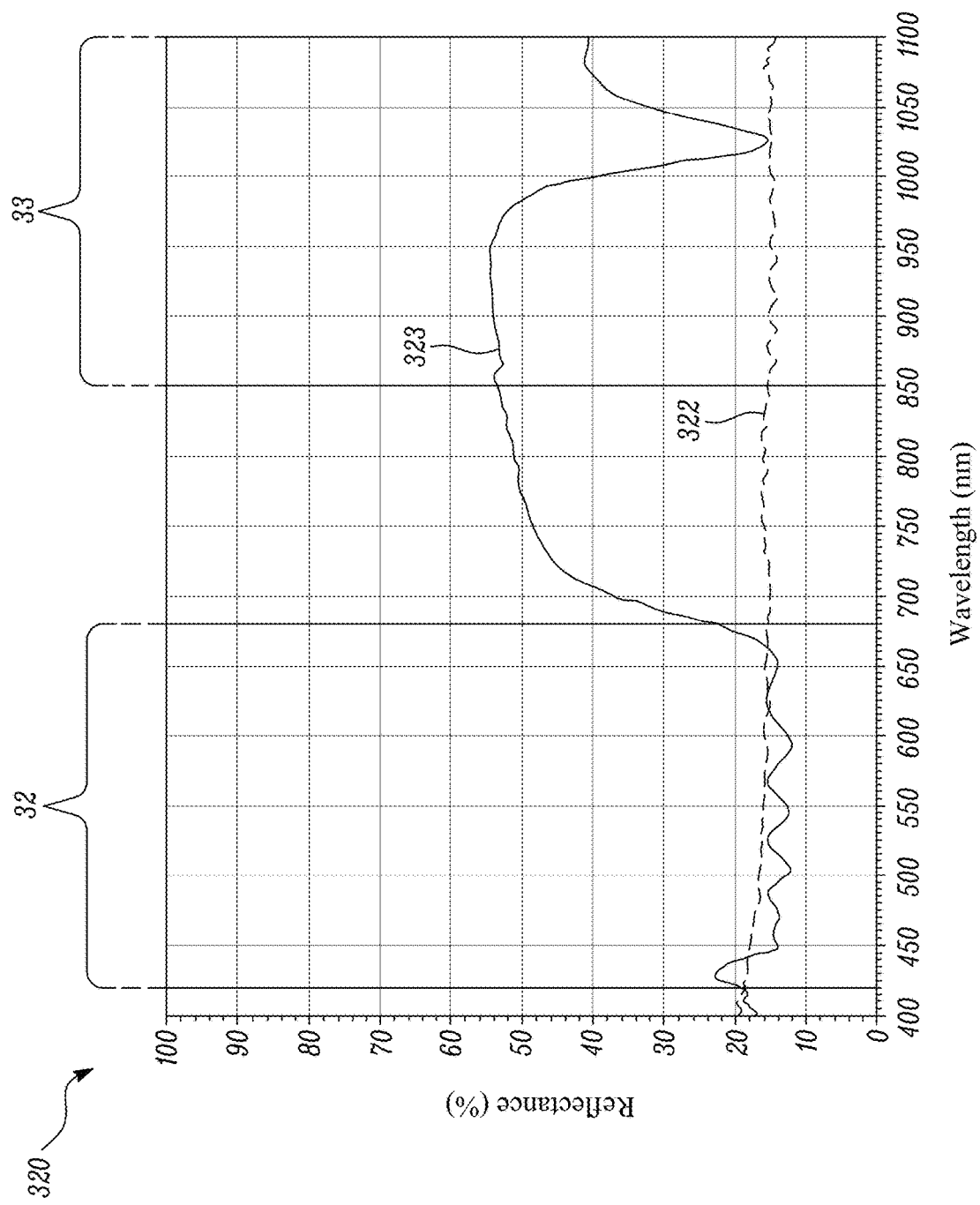
FIG. 3B illustrates a plot depicting respective optical reflectances versus wavelength of the plurality of polymeric second layers and the reflective polarizer of FIG. 1, for the incident light polarized along the second direction and for the second incident angle, according to an embodiment of the present disclosure.

FIG. 3B illustrates a plot 320 depicting respective optical reflectances versus wavelength of the plurality of polymeric second layers 20 (shown in FIG. 1) and the reflective polarizer 200 (shown in FIG. 1), for the incident light 30 (shown in FIG. 1) incident in the incident plane 31 (shown in FIG. 1) and incident at the second incident angle α2 of greater than about 40 degrees, when the incident plane 31 includes the second direction. Wavelength is expressed in nanometers (nm) in the abscissa. Optical reflectance is expressed as a reflectance percentage in the left ordinate axis.

The plot 320 includes a curve 322 depicting the optical reflectance versus wavelength of the plurality of polymeric second layers 20 and a curve 323 depicting the optical reflectance versus wavelength of the reflective polarizer 200, for the incident light 30 incident in the incident plane 31 and incident at the second incident angle α2 of greater than about 40 degrees, when the incident plane 31 includes the second direction.

Referring to the curve 322, for the incident light 30 incident in the incident plane 31, for the visible wavelength range 32, and for the second incident angle α2 of greater than about 40 degrees, the plurality of polymeric second layers 20 has an average optical reflectance of R2ν(y), when the incident plane 31 includes the second direction.

In some examples, the second incident angle α2 is about 60 degrees and the average optical reflectance R2ν(y) is about 16.3%.

Referring to FIGS. 3A-3B, in some embodiments, the average optical reflectance R2ν(y) is less than the average optical reflectance R2ν(x) by at least 2.5%. In some embodiments, the average optical reflectance R2ν(y) is less than the average optical reflectance R2ν(x) by at least 5%, at least 7.5%, at least 10%, at least 12.5%, or at least 15%.

In some examples, the second incident angle α2 is about 60 degrees and the average optical reflectance R2ν(y) is less than the average optical reflectance R2ν(x) by about 15.3%.

Further, the average optical reflectance R2ν(y) is less than the average optical reflectance R2ν(x), such that the average optical reflectance R2ν(y) is greater than about 5% and the average optical reflectance R2ν(x) is less than about 60%, i.e., 5%<R2ν(y)<R2ν(x)<60%. In some embodiments, R2ν(y)>7.5%, R2ν(y)>10%, R2ν(y)>12.5%, or R2ν(y)>15%. In some embodiments, R2ν(x)<55%, R2ν(x)<50%, R2ν(x)<45%, R2ν(x)<40%, or R2ν(x)<35%.

With continued reference to the curve 322, in some embodiments, for the incident light 30 incident in the incident plane 31, for the infrared wavelength range 33, and for the second incident angle α2 of greater than about 40 degrees, the plurality of polymeric second layers 20 has an average optical reflectance of R2ir(y), when the incident plane 31 includes the second direction.

In some examples, the second incident angle α2 is about 60 degrees and the average optical reflectance R2ir(y) is about 14.9%.

Referring to the curve 323, for the incident light 30 incident in the incident plane 31, for the visible wavelength range 32, and for the second incident angle α2 of greater than about 40 degrees, the reflective polarizer 200 has an average optical reflectance of R3ν(y), when the incident plane 31 includes the second direction.

In some examples, the second incident angle α2 is about 60 degrees and the average optical reflectance R3v(y) is about 15.1%.

With continued reference to the curve 323, for the incident light 30 incident in the incident plane 31, for the infrared wavelength range 33, and for the second incident angle α2 of greater than about 40 degrees, the reflective polarizer 200 has an average optical reflectance of R3ir(y), when the incident plane 31 includes the second direction.

In some examples, the second incident angle α2 is about 60 degrees and the average optical reflectance R3ir(y) is about 44.4%.

Referring to the curve 313 (shown in FIG. 3A) and the curve 323, it can be observed that, for the incident light 30 incident in the incident plane 31 and incident at the second incident angle α2 of greater than about 40 degrees, the reflective polarizer 200 blocks a greater portion of the incident light 30 in the infrared wavelength range 33 when the incident plane 31 includes the second direction than when the incident plane 31 includes the first direction.

Referring to the curve 223 (shown in FIG. 2B) and the curve 323, it can be observed that, for the incident light 30 incident in the incident plane 31 including the second direction, the reflective polarizer 200 blocks a greater portion of the incident light 30 in the infrared wavelength range 33 when the incident light 30 is incident at the first incident angle α1 than when the incident light 30 is incident at the second incident angle α2.

Figure 4A:
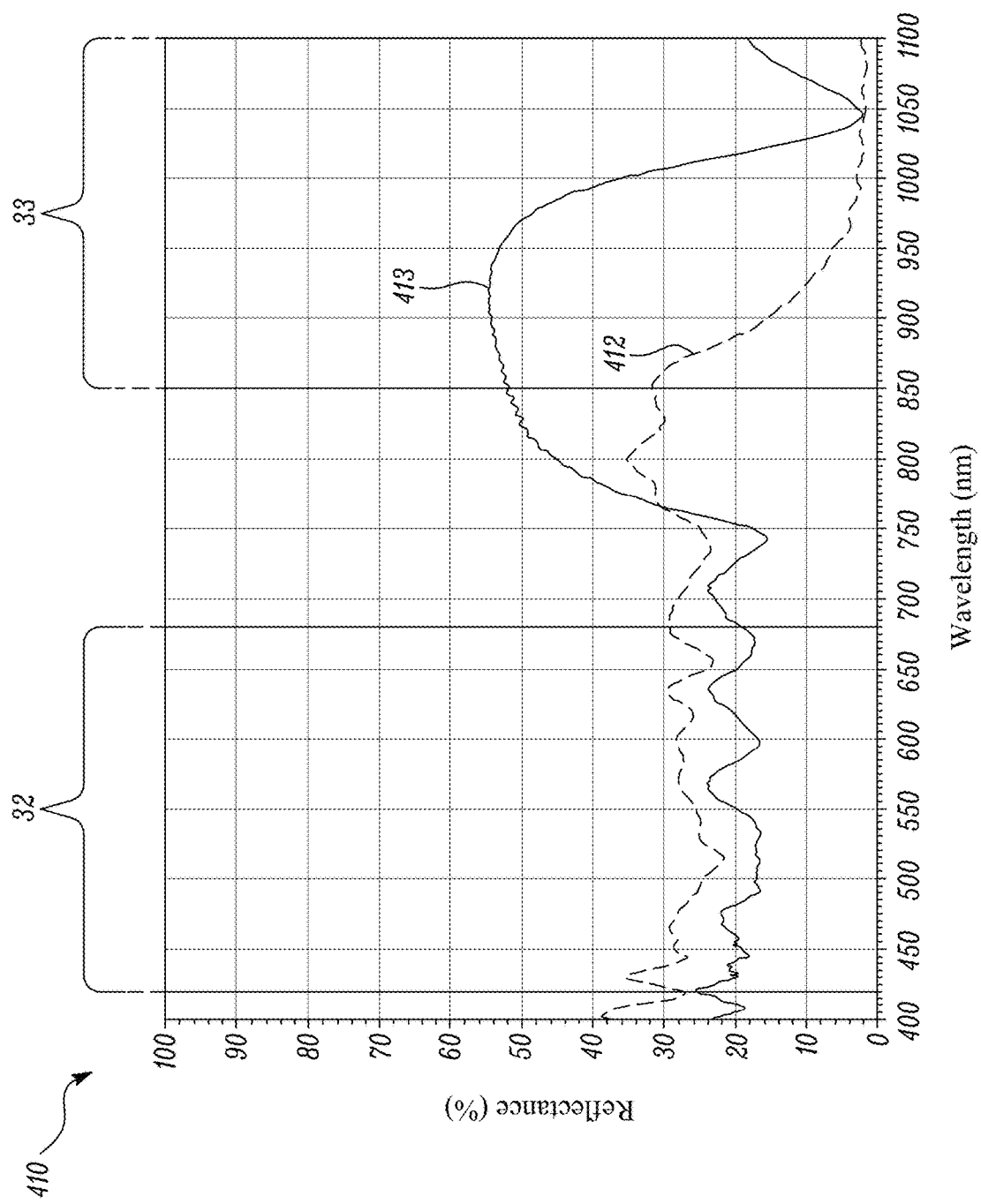
FIG. 4A illustrates a plot depicting the respective optical reflectances versus wavelength of the plurality of polymeric second layers and the reflective polarizer of FIG. 1, for the incident light polarized along the first direction and for the second incident angle, according to another embodiment of the present disclosure.

FIG. 4A illustrates a plot 410 depicting the respective optical reflectances versus wavelength of the plurality of polymeric second layers 20 and the reflective polarizer 200, for the incident light 30 incident in the incident plane 31 and incident at the second incident angle α2 of greater than about 40 degrees, when the incident plane 31 includes the first direction, according to another embodiment of the present disclosure. Wavelength is expressed in nanometers (nm) in the abscissa. Optical reflectance is expressed as a reflectance percentage in the left ordinate axis.

The plot 410 includes a curve 412 depicting the optical reflectance versus wavelength of the plurality of polymeric second layers 20 and a curve 413 depicting the optical reflectance versus wavelength of the reflective polarizer 200, for the incident light 30 incident in the incident plane 31 and incident at the second incident angle α2 of greater than about 40 degrees, when the incident plane 31 includes the first direction.

Referring to the curve 412, in the illustrated embodiment of FIG. 4A, the second incident angle α2 is about 45 degrees, the average optical reflectance R2v(x) is about 26.9%, and the average optical reflectance R2ir(x) is about 8.7%.

Referring to the curve 413, in the illustrated embodiment of FIG. 4A, the second incident angle α2 is about 40 degrees, the average optical reflectance R3v(x) is about 19.6%, and the average optical reflectance R3ir(x) is about 36.2%.

Figure 4B:
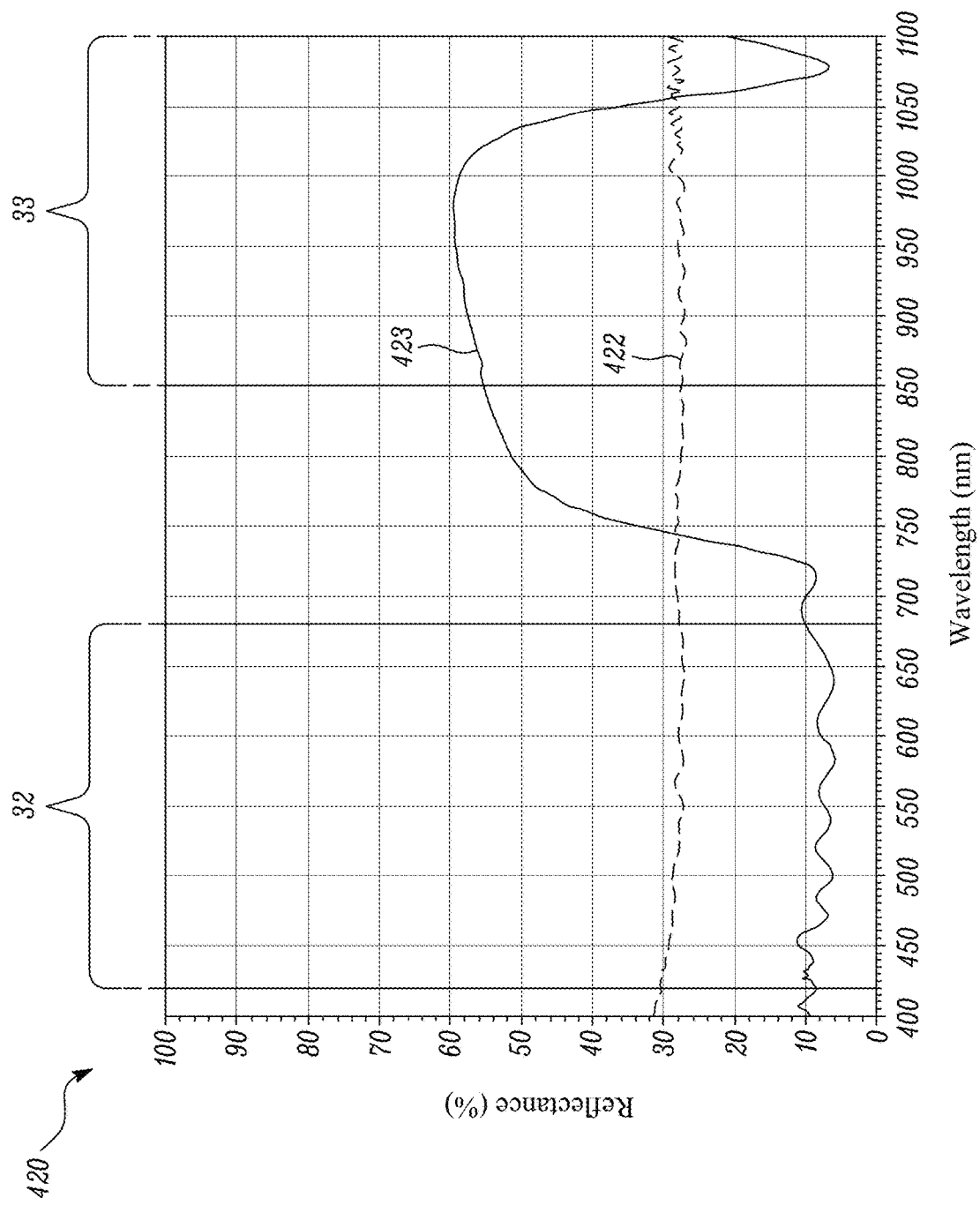
FIG. 4B illustrates a plot depicting the respective optical reflectances versus wavelength of the plurality of polymeric second layers and the reflective polarizer of FIG. 1, for the incident light polarized along the second direction and for the second incident angle, according to another embodiment of the present disclosure.

FIG. 4B illustrates a plot 420 depicting the respective optical reflectances versus wavelength of the plurality of polymeric second layers 20 (shown in FIG. 1) and the reflective polarizer 200 (shown in FIG. 1), for the incident light 30 (shown in FIG. 1) incident in the incident plane 31 (shown in FIG. 1) and incident at the second incident angle α2 of greater than about 40 degrees, when the incident plane 31 includes the second direction, according to another embodiment of the present disclosure. Wavelength is expressed in nanometers (nm) in the abscissa. Optical reflectance is expressed as a reflectance percentage in the left ordinate axis.

The plot 420 includes a curve 422 depicting the optical reflectance versus wavelength of the plurality of polymeric second layers 20 and a curve 423 depicting the optical reflectance versus wavelength of the reflective polarizer 200, for the incident light 30 incident in the incident plane 31 and incident at the second incident angle α2 of greater than about 40 degrees, when the incident plane 31 includes the second direction.

Referring to the curve 422, in the illustrated embodiment of FIG. 4B, the second incident angle α2 is about 45 degrees, the average optical reflectance R2v(y) is about 28.1%, and the average optical reflectance R2ir(y) is about 27.7%.

Referring to the curve 423, in the illustrated embodiment of FIG. 4B, the second incident angle α2 is about 40 degrees, the average optical reflectance R3v(y) is about 7.8%, and the average optical reflectance R3ir(y) is about 48.3%.

Figure 5A:
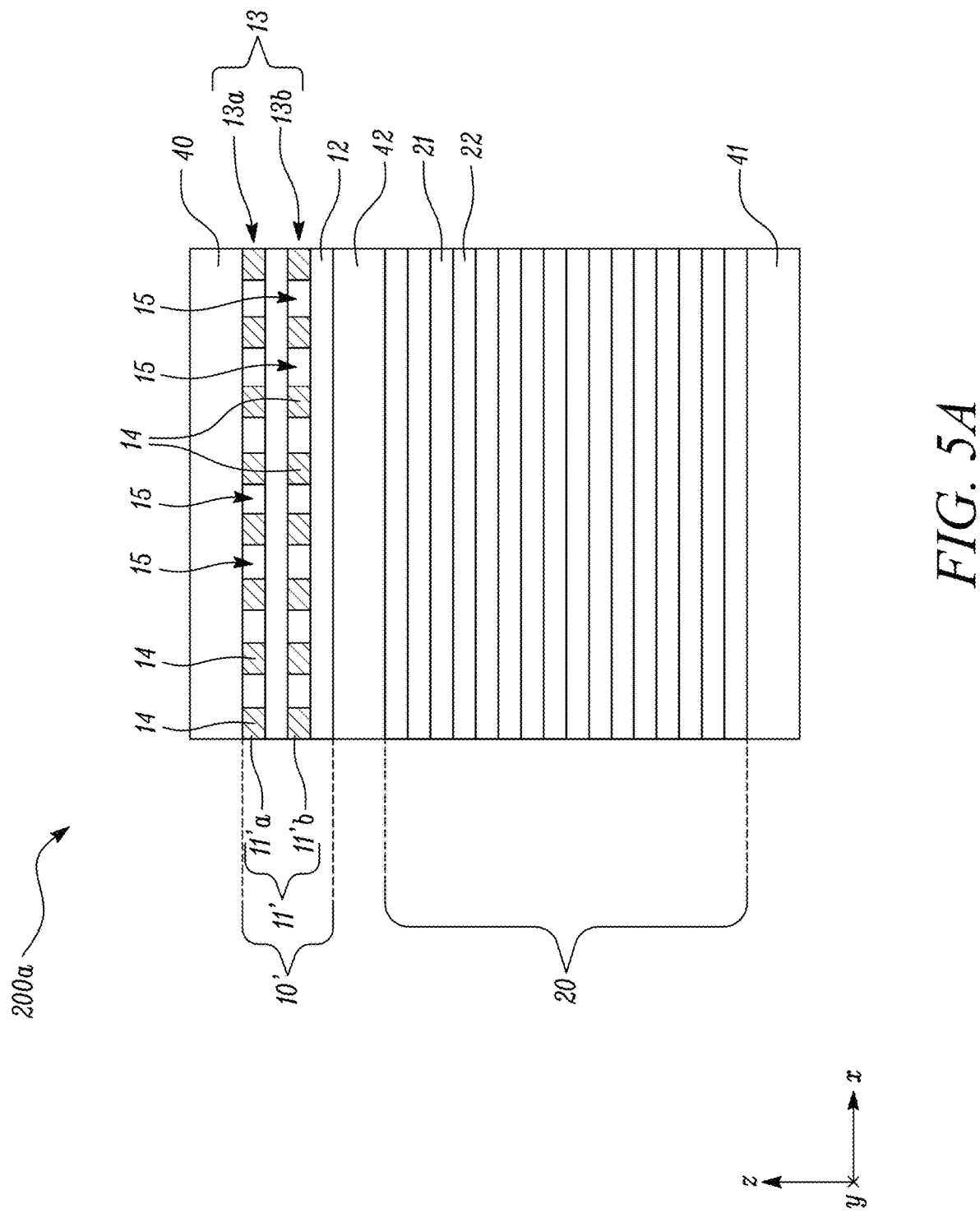
FIG. 5A illustrates a detailed schematic sectional view of a reflective polarizer, according to another embodiment of the present disclosure.

FIG. 5A illustrates a detailed schematic sectional view of a reflective polarizer 200a, according to another embodiment of the present disclosure.

The reflective polarizer 200a is substantially similar to the reflective polarizer 200 shown in FIG. 1. However, the reflective polarizer 200a includes a plurality of first layers 10' including a plurality of alternating A-layers 11' and the B-layers 12. Common components between the reflective polarizer 200 and the reflective polarizer 200a are referenced by the same numeral reference.

In some embodiments, the A-layers 11' are equivalent to the A-layers 11 (shown in FIG. 1). However, each of the A-layers 11' is patterned. Specifically, each of the A-layers 11', but none of the B-layers 12, is patterned to form an electrically conductive mesh 13 (also shown in FIG. 5C). In the illustrated embodiment of FIG. 5A, the plurality of first layers 10' includes at least first and second A-layers 11'a, 11'b. The at least first and second A-layers 11'a, 11'b are patterned to form respective at least first and second electrically conductive meshes 13a, 13b. In some embodiments, the electrically conductive meshes 13 of the A-layers 11' are aligned with each other. In the illustrated embodiment of FIG. 5A, the at least first and second electrically conductive meshes 13a, 13b of the at least first and second A-layers 11'a, 11'b are aligned with each other.

Figure 5B:
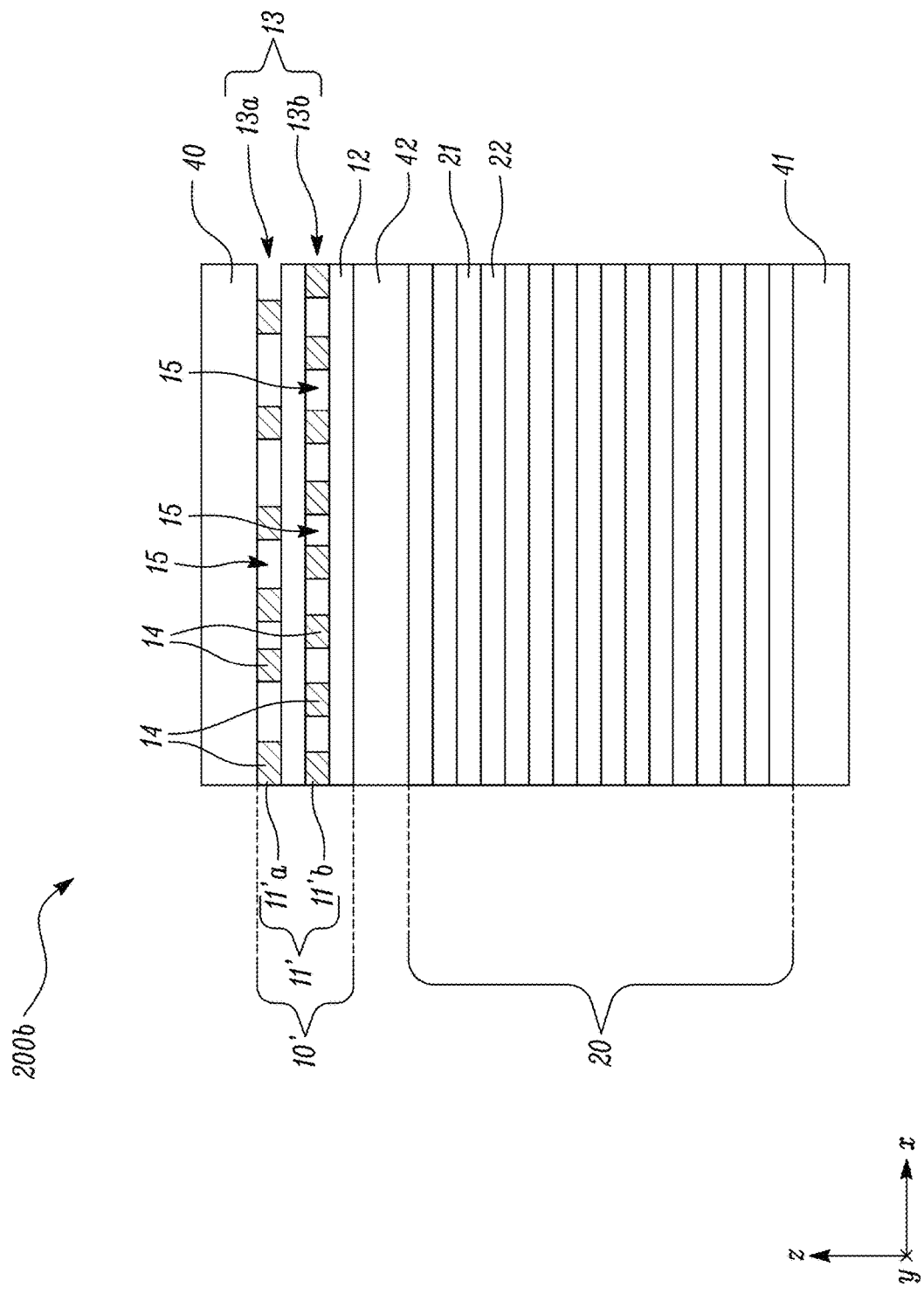
FIG. 5B illustrates a detailed schematic sectional view of a reflective polarizer, according to another embodiment of the present disclosure.

FIG. 5B illustrates a detailed schematic sectional view of a reflective polarizer 200b, according to another embodiment of the present disclosure. The reflective polarizer 200b is substantially similar to the reflective polarizer 200a shown in FIG. 5A. However, in the reflective polarizer 200b, the at least first and second electrically conductive meshes 13a, 13b of the A-layers 11' are misaligned relative to each other. Specifically, in the reflective polarizer 200b, the at least first and second electrically conductive meshes 13a, 13b of the at least first and second A-layers 11'a, 11'b are misaligned relative to each other.

Figure 5C:
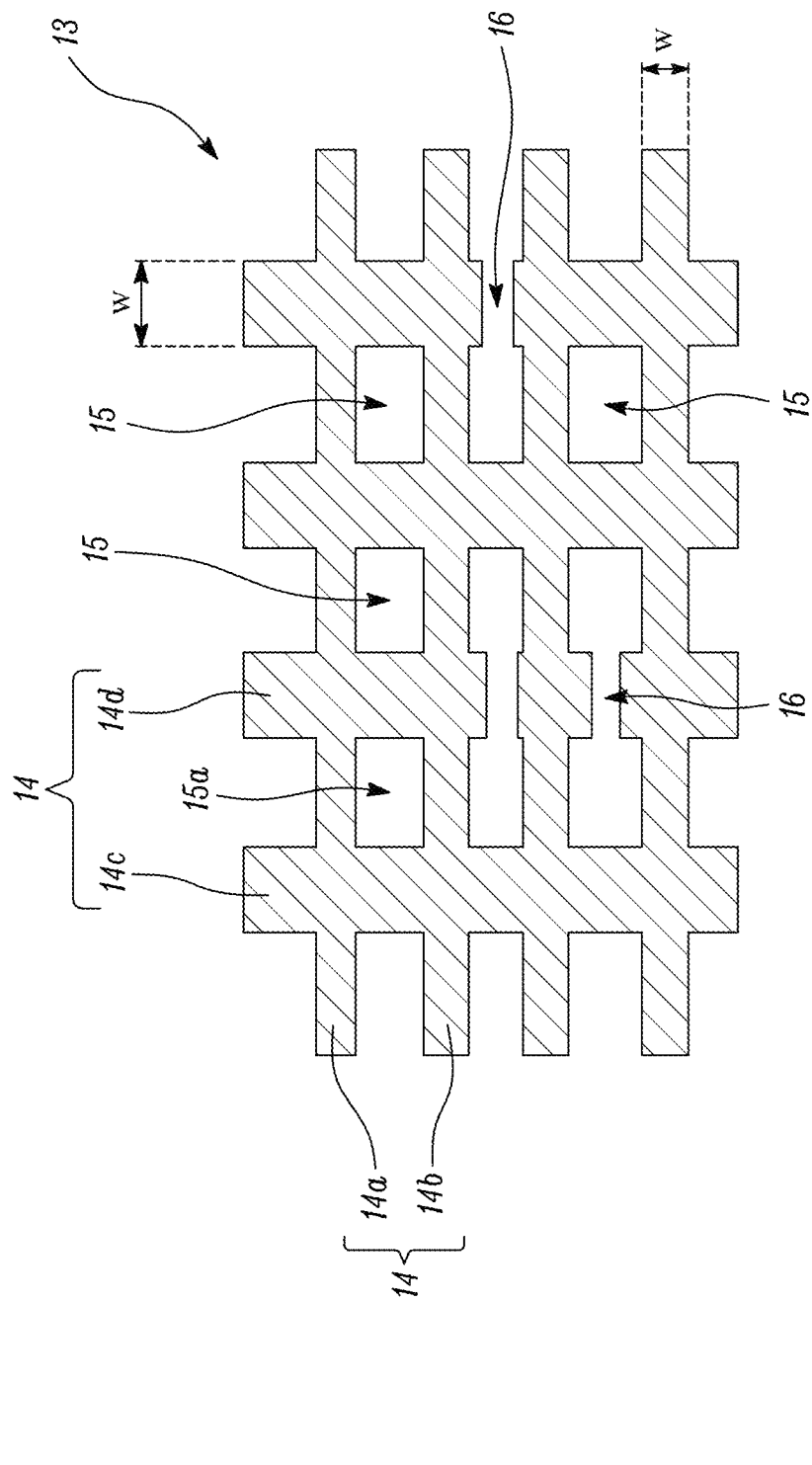
FIG. 5C illustrates a schematic plan top view of an electrically conductive mesh of the reflective polarizers of FIGS. 5A and 5B, according to an embodiment of the present disclosure.

FIG. 5C illustrates a schematic plan top view of the electrically conductive mesh 13 of the reflective polarizers 200a, 200b (shown in FIGS. 5A and 5B, respectively), according to an embodiment of the present disclosure.

Referring to FIGS. 5A-5C, in some embodiments, the electrically conductive mesh 13 includes a plurality of electrically conductive traces 14 connected to define a plurality of enclosed open areas 15 therebetween. In some embodiments, the plurality of electrically conductive traces 14 may be arranged substantially along the x- and y-axes, such that any two adjacent electrically conductive traces (such as electrically conductive traces 14*a*, 14*b*) arranged along any one of the x- and y-axes are substantially parallel and spaced apart from each other.

Further, in some embodiments, an enclosed open area 15 (such as an enclosed open area 15*a*) may be formed between a pair of adjacent electrically conductive traces 14 (such as the electrically conductive traces 14*a*, 14*b*) arranged along the x-axis and a pair of adjacent electrically conductive traces 14 (such as electrically conductive traces 14*c*, 14*d*) arranged along the y-axis.

In some embodiments, the electrically conductive traces 14 of the electrically conductive mesh 13 include a plurality of breaks 16 therein for at least affecting an electrical conductivity of the electrically conductive mesh 13. For example, the plurality of breaks 16 may decrease the electrical conductivity of the electrically conductive mesh 13.

In some embodiments, a percent open area of the electrically conductive mesh 13 is greater than about 70%. In other words, the percent open area of the electrically conductive mesh 13, which includes a sum of areas of the plurality of enclosed open areas 15, is greater than about 70% of an area of the respective A-layer 11'. In some embodiments, the percent open area of the electrically conductive mesh 13 is greater than about 75%, greater than about 80%, greater than about 85%, greater than about 90%, or greater than about 95%.

In some embodiments, the plurality of electrically conductive traces 14 has an average width w. The term "average width w", as used herein, refers to an average of width of the electrically conductive traces 14. The width of the electrically conductive trace 14 may be defined along a direction orthogonal to a longitudinal axis of the electrically conductive trace 14. In some embodiments, the average width w of the electrically conductive traces 14 is less than about 20 microns. In some embodiments, the average width w of the electrically conductive traces 14 is less than about 15 microns, less than about 10 microns, less than about 5 microns, less than about 3 microns, or less that about 2 microns.

Referring to FIGS. 5A and 5C, the electrically conductive meshes 13 of the A-layers 11' are aligned with each other so that from the plan top view, a percent open area of the plurality of first layers 10' is substantially equal to the percent open area of each of the electrically conductive meshes 13 (such as the at least first and second electrically conductive meshes 13*a*, 13*b*) of the A-layers 11' (such as the at least first and second A-layers 11'*a*, 11'*b*). In other words, the percent open area of the plurality of first layers 10' is substantially equal to the percent open area of each of the electrically conductive meshes 13, when viewed from the plan top view.

Referring now to FIGS. 5B and 5C, the electrically conductive meshes 13 of the A-layers 11' are misaligned relative to each other so that from the plan top view, the percent open area of the plurality of first layers 10' is less than the percent open area of each of the at least first and second electrically conductive meshes 13 (such as the electrically conductive meshes 13*a*, 13*b*). In other words, the percent open area of the plurality of first layers 10' is less than the percent open area of each the at least first and second electrically conductive meshes 13*a*, 13*b*, when viewed from the plan top view.

FIG. 6A illustrates a schematic side view of the vehicle 50 including the windshield 60. The vehicle 50 may include any navigable vehicle that may be operated on a road surface, and includes, without limitation, cars, buses, motorcycles, off-road vehicles, and trucks. In some other embodiments, the vehicle 50 may also include water vehicles and aircrafts. In some embodiments, the windshield 60 of the vehicle 50 may include any of a wide variety of transparent members, and can be unitary or laminated, flat or curved (simple or compound curvature), water clear or tinted, can have focusing properties, and can be composed of any conventional glasses and/or plastics.

FIG. 6B illustrates a detailed schematic sectional view of a portion of the windshield 60 of the vehicle 50 shown in FIG. 6A, according to an embodiment of the present disclosure. In some embodiments, the windshield 60 includes the reflective polarizer 200 shown in FIG. 1. However, in some embodiments, the windshield 60 may include the reflective polarizers 200*a*, 200*b* shown in FIGS. 5A and 5B, respectively. In the illustrated embodiment of FIG. 6B, the windshield 60 described herein includes the reflective polarizer 200 shown in FIG. 1.

Referring now to FIGS. 1, 6A and 6B, in some embodiments, the windshield 60 of the vehicle 50 faces an exterior 51 of the vehicle 50 on one side of the windshield 60 and faces an interior 52 of the vehicle 50 on another opposing side of the windshield 60. In such embodiments, the plurality of first layers 10 faces the exterior 51 of the vehicle 50 and the plurality of polymeric second layers 20 faces the interior 52 of the vehicle 50.

In some embodiments, the windshield 60 includes the at least one substrate 61. In some embodiments, the at least substrate 61 includes glass. In some embodiments, the reflective polarizer 200 is bonded to the at least one substrate 61.

In the illustrated embodiment of FIG. 6B, the reflective polarizer 200 is sandwiched between the pair of substrates 61. In some embodiments, the reflective polarizer 200 is bonded to the pair of substrates 61 by one or more bonding layers 62. In some embodiments, the one or more bonding layers 62 may include an optically clear adhesive (OCA). In some embodiments, the one or more bonding layers 62 may include a pressure sensitive adhesive (PSA), which may include one or more of PVB, acrylic, and polyurethane. In some other embodiments, the one or more bonding layers 62 may include epoxy, lamination, or any other suitable layer. The reflective polarizer 200 including at least 30% of the first layers 10 having at least 30% by weight of the inorganic material may exhibit improved adhesion with the substrates 61.

FIG. 6C illustrates a detailed schematic sectional view of a portion of the windshield 60 of the vehicle 50 shown in FIG. 6A, according to another embodiment of the present disclosure. In the illustrated embodiment of FIG. 6C, the windshield 60 includes the reflective polarizer 200 shown in FIG. 1. In some other embodiments, the windshield 60 may include the reflective polarizers 200*a*, 200*b* shown in FIGS. 5A and 5B, respectively. Further, the at least one substrate 61 includes one substrate 61.

Referring now to FIGS. 1, 6A and 6C, the at least one substrate 61 includes an inner surface 64 facing the interior 52 of the vehicle 50 and an opposing outer surface 65 facing the exterior 51 of the vehicle 50. In some embodiments, the reflective polarizer 200 is bonded to the inner surface 64 of the at least one substrate 61. In some embodiments, the reflective polarizer 200 is bonded to the inner surface 64 of the at least one substrate 61 by the one or more bonding layers 62. In some embodiments, the reflective polarizer 200 may be laminated to the inner surface 64 of the at least one substrate 61 by the one or more bonding layers 62. In the illustrated embodiment of FIG. 6C, the reflective polarizer 200 is bonded to the inner surface 64 of the one substrate 61 by one bonding layer 62. In some embodiments, the plurality of first layers 10 of the reflective polarizer 200 faces the exterior 51 of the vehicle 50 and the plurality of polymeric second layers 20 of the reflective polarizer 200 faces the interior 52 of the vehicle 50. In some embodiments, a hard coat layer (not shown) may be disposed on the reflective polarizer 200 opposite to the at least one substrate 61. The hard coat layer may protect the reflective polarizer 200 from any damage. The reflective polarizer 200 including at least 30% of the first layers 10 having at least 30% by weight of the inorganic material may exhibit improved adhesion with the at least one substrate 61.

Referring now to FIGS. 1, 6A-6C, in some embodiments, at least some of the first layers 10 in the reflective polarizer 200 are electrically conductive. In some embodiments, the electrically conductive first layers 10 include a metal. Specifically, some of the A-layers 11 of the first layers 10 may include the metal in order to be electrically conductive. In some embodiments, the electrically conductive first layers 10 are electrically connected to a power source 63 configured to pass an electric current through the electrically conductive first layers 10 to heat the windshield 60. Heating of the windshield 60 may melt and/or clear a buildup of frost, ice, or snow that may be accumulated on the windshield 60 for clear viewing through the windshield 60.

Figure 7B:
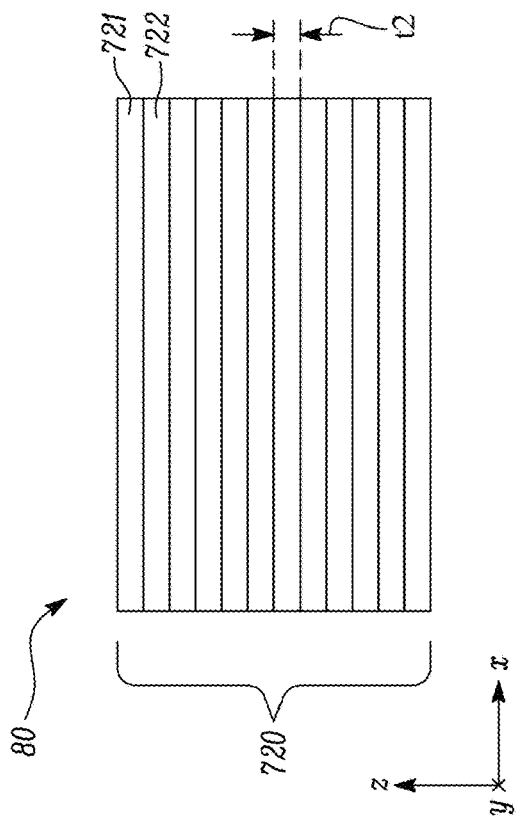
FIG. 7B illustrates a detailed schematic sectional view of an optical film of the integral optical construction of FIG. 7A, according to an embodiment of the present disclosure.
Figure 7D:
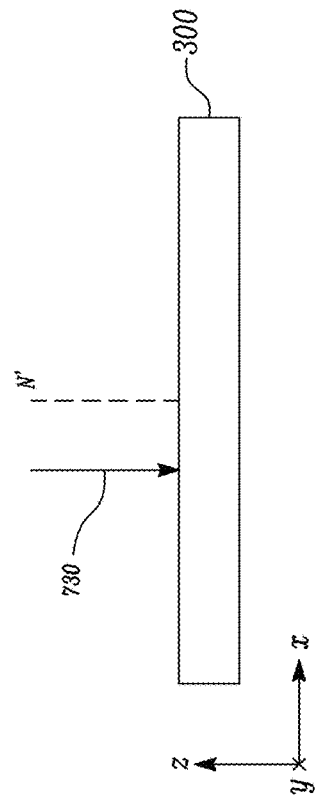
FIG. 7D illustrates a schematic sectional view of the integral optical construction of FIG. 7A, according to an embodiment of the present disclosure.
Figure 7A:
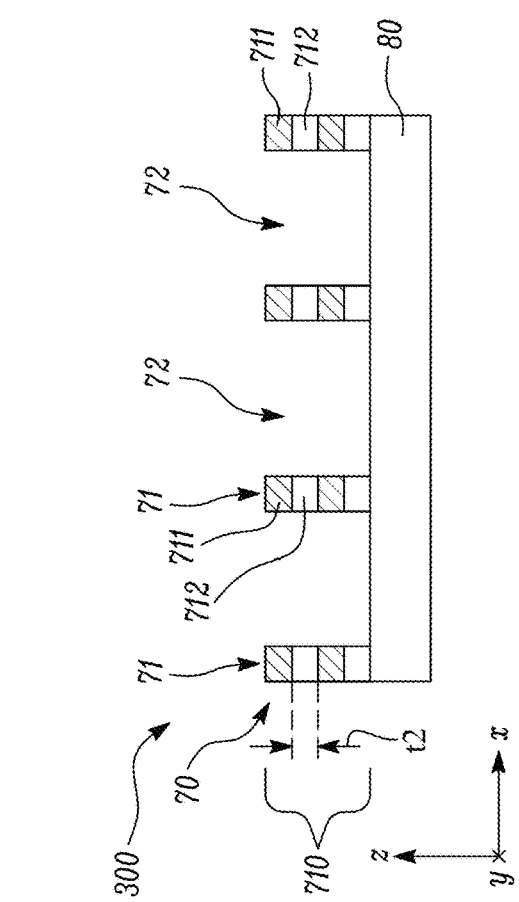
FIG. 7A illustrates a detailed schematic sectional view of an integral optical construction, according to an embodiment of the present disclosure.

FIG. 7A illustrates a detailed schematic sectional view of an integral optical construction 300, according to another embodiment of the present disclosure. The integral optical construction 300 includes a mesh 70 disposed on an optical film 80. In some embodiments, the optical film 80 may be an integral optical film 80 and may be interchangeably referred to as "the integral optical film 80". The mesh 70 is electrically conductive along at least one direction (e.g., the first and second directions) across the integral optical construction 300.

FIG. 7B illustrates a detailed schematic sectional view of the optical film 80, according to an embodiment of the present disclosure. The optical film 80 includes a plurality of polymeric first layers 720 numbering M1 in total. The plurality of polymeric first layers 720 may be interchangeably referred to as "the polymeric first layers 720". In some embodiments, the plurality of polymeric first layers 720 includes a plurality of alternating polymeric layers 721, 722 numbering M1 in total. The polymeric layers 721, 722 may be similar to the polymeric C-layers 21 (shown in FIG. 1) and the polymeric D-layers 22 (shown in FIG. 1), respectively.

M1 is greater than or equal to about 10, i.e., M1≥10. In some embodiments, M1≥20, M1≥50, M1≥100, M1≥200, M1≥300, M1≥400, or M1≥500.

Figure 7C:
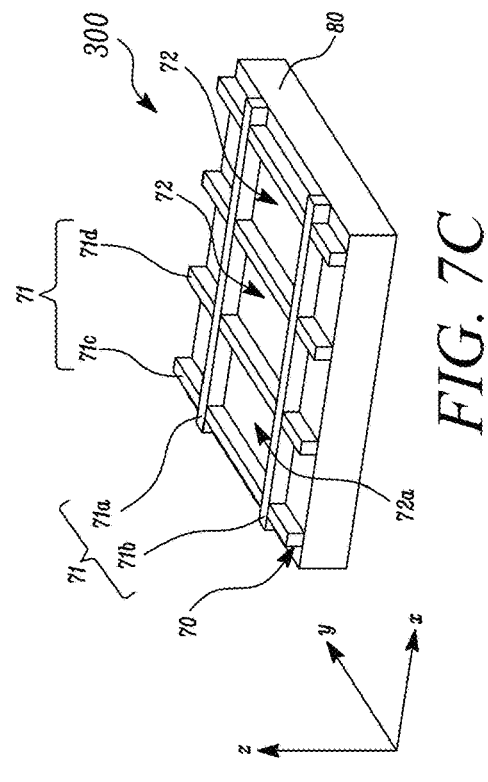
FIG. 7C illustrates a perspective view of the integral optical construction of FIG. 7A, according to an embodiment of the present disclosure.

FIG. 7C illustrates a perspective view of the integral optical construction 300, according to an embodiment of the present disclosure. Referring now to FIGS. 7A-7C, the mesh 70 includes a plurality of traces 71 connected to define a plurality of enclosed open areas 72 therebetween. In some embodiments, the plurality of traces 71 may be arranged substantially along the x- and y-axes, such that any two adjacent traces (such as traces 71a, 71b) arranged along any one of the x- and y-axes are substantially parallel and spaced apart from each other.

Further, in some embodiments, an enclosed open area 72 (such as an enclosed open area 72a) may be formed between a pair of adjacent traces 71 (such as the traces 71a, 71b) arranged along the x-axis and another pair of adjacent traces 71 (such as traces 71c, 71d) arranged along the y-axis.

Each of the traces 71 includes a plurality of alternating electrically conductive second and electrically insulative third layers 711, 712 numbering M2 in total. The plurality of electrically conductive second layers 711 may be interchangeably referred to as "the second layers 711", and the plurality of electrically insulative third layers 712 may be interchangeably referred to as "the third layers 712". The plurality of alternating electrically conductive second and electrically insulative third layers 711, 712 may be collectively referred to as "the plurality of second and third layers 710". Therefore, each of the traces 71 includes the plurality of second and third layers 710 numbering M2 in total. M2 is greater than or equal to about 4 and less than or equal to M1, i.e., 4≤M2≤M1.

Each of the first, second and third layers 720, 711, 712 (first through third layers 720, 711, 712) has an average thickness t2. Each of the first through third layers 720, 711, 712 defines the average thickness t2 along the z-axis. The term "average thickness t2", as used herein, refers to an average thickness along a plane (i.e., the x-y plane) of each of the first through third layers 720, 711, 712. Each of the first through third layers 720, 711, 712 has the average thickness t2 of less than about 500 nm. In some embodiments, each of the first through third layers 720, 711, 712 has the average thickness t2 of less than about 400 nm, less than about 300 nm, or less than about 200 nm.

FIG. 7D illustrates a schematic sectional view of the integral optical construction 300, according to an embodiment of the present disclosure. FIG. 7D further illustrates a substantially normally incident light 730 incident on the integral optical construction 300, i.e., the incident light 730 makes an angle of about 0 degree with respect to a normal N' to the integral optical construction 300. The normal N' is substantially along the z-axis.

Referring now to FIGS. 7A-7D, for the substantially normally incident light 730 and an infrared wavelength range (such as the infrared wavelength range 33 shown in FIG. 2A), the integral optical construction 300 and the plurality of alternating electrically conductive second and electrically insulative third layers 711, 712 have respective average optical reflectances R3'$ir$ and R1'$ir$ in the infrared wavelength range.

In some embodiments, a difference between the average optical reflectance R1'$ir$ and the average optical reflectance R3'$ir$ is greater than about 10%, i.e., (R1'$ir$–R3'$ir$)>10%. In some embodiments, (R1'$ir$–R3'$ir$)>15%, (R1'$ir$–R3'$ir$)>20%, (R1'$ir$–R3'$ir$)>25%, (R1'$ir$–R3'$ir$)>30%, or (R1'$ir$–R3'$ir$)>32.5%. In some examples, the average optical reflectance R3'$ir$ is about 58.8%, the average optical reflectance R1'$ir$ is about 93.5%, and (R1'$ir$–R3'$ir$) is about 34.7%.

In some embodiments, the windshield 60 of the vehicle 50 (shown in FIG. 6A) may also include the integral optical construction 300 including the plurality of traces 71. Since the plurality of traces 71 includes the plurality of alternating electrically conductive second and electrically insulative third layers 711, 712, the electrically conductive second layers 711 may be connected to the power source 63 (shown in FIG. 6B) configured to pass an electric current through the electrically conductive second layers 711 to heat the windshield 60 in order to facilitate clearing of moisture, frost, snow, condensation, etc., that may be accumulated on the windshield 60 for clear viewing through the windshield 60.

Figure 8B:
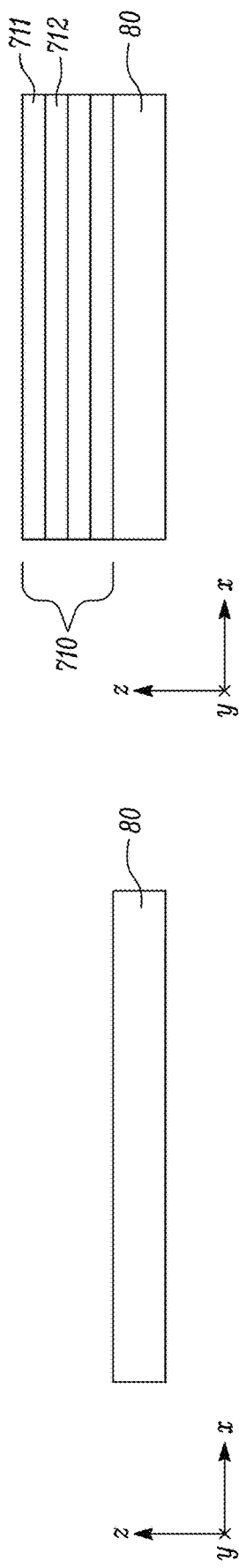
FIGS. 8A to 8C illustrate steps of making the integral optical construction of FIG. 7A, according to an embodiment of the present disclosure.
Figure 8A:
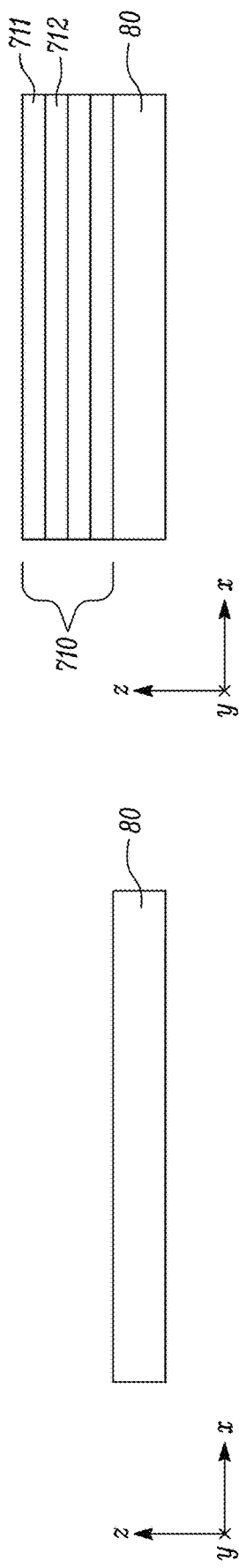
Figure 8C:
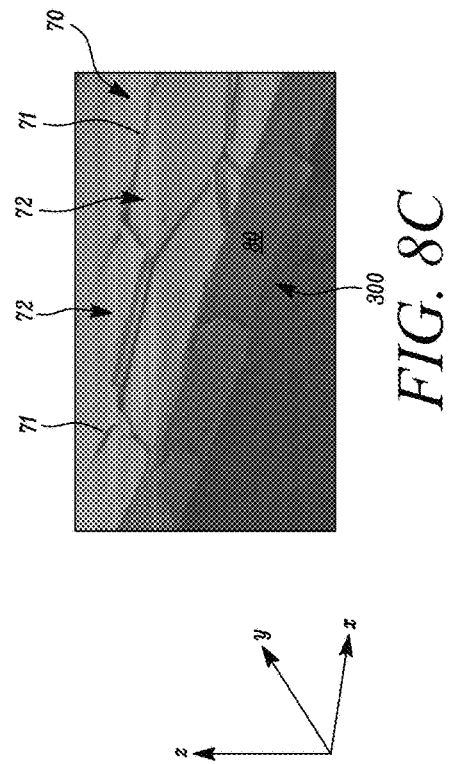
Figure 9:
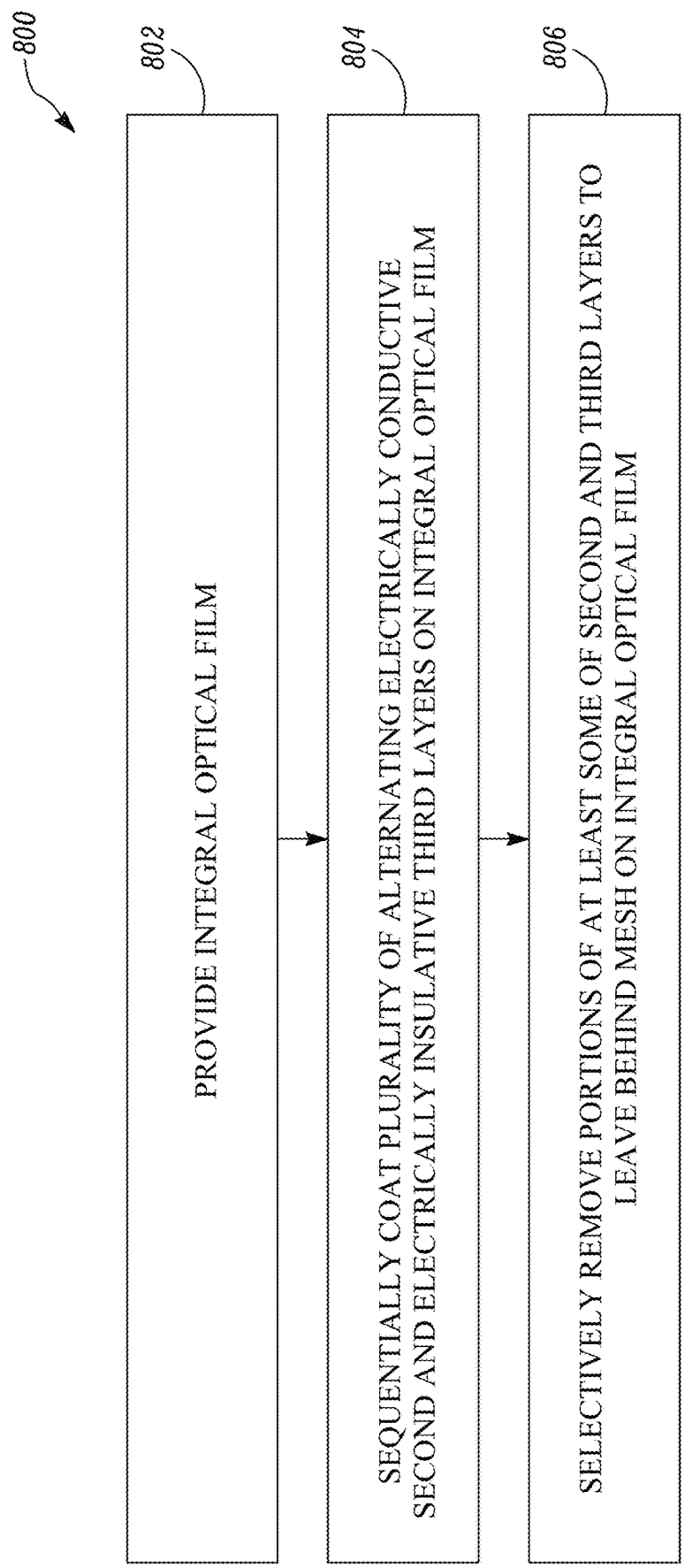
FIG. 9 illustrates a flowchart depicting a method of making the integral optical construction of FIG. 7A, according to an embodiment of the present disclosure.

FIGS. 8A to 8C illustrate steps of making the integral optical construction 300 shown in FIG. 7A, according to an embodiment of the present disclosure. FIG. 9 illustrates a flowchart depicting a method 800 of making the integral optical construction 300 shown in FIG. 7A, according to an embodiment of the present disclosure. The method 800 will be described with reference to FIGS. 8A to 8C.

Referring now to FIGS. 8A and 9, at step 802, the method 800 includes providing the integral optical film 80. The integral optical film 80 includes the plurality of polymeric first layers 720 (shown in FIG. 7B) numbering M1 in total.

Referring now to FIGS. 8B and 9, at step 804, the method 800 includes sequentially coating the plurality of alternating electrically conductive second and electrically insulative third layers 711, 712 on the integral optical film 80.

Referring now to FIGS. 8C and 9, at step 806, the method 800 includes selectively removing portions of at least some of the second and third layers 711, 712 (shown in FIG. 8B) to leave behind the mesh 70 on the integral optical film 80. Specifically, the method 800 includes selectively removing portions of at least some of the second and third layers 711, 712 to leave behind the mesh 70 on the integral optical film 80 thereby forming the integral optical construction 300 (also shown in FIG. 7A). The mesh 70 includes the plurality of traces 71 connected to define the plurality of enclosed open areas 72 therebetween. Each of the traces 71 includes portions of the alternating electrically conductive second and electrically insulative third layers 711, 712. In some embodiments, selectively removing the portions of the at least some of the second and third layers 711, 712 includes punching the portions.

The integral optical construction 300 made by the method 800 described above may provide the desired optical properties, such as substantial infrared rejection. Further, the integral optical construction 300 made by the method 800 may include the plurality of alternating electrically conductive second and electrically insulative third layers 711, 712 that may be substantially thinner than infrared rejection layers of a conventional polymeric multilayer reflective polarizers.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A reflective polarizer comprising a plurality of first layers numbering N1 in total disposed on a plurality of polymeric second layers numbering N2 in total, 2<N1<50, N2-N1>10, each of the first and polymeric second layers having an average thickness of less than about 500 nm, each of at least 30% of the first layers comprising at least 30% by weight of an inorganic material, such that for an incident light incident in an incident plane, a visible wavelength range extending from about 420 nm to about 680 nm, and an infrared wavelength range extending from about 850 nm to about 1100 nm:

for a first incident angle of less than about 10 degrees, the reflective polarizer, and the plurality of first layers have respective average optical reflectances R3v and R1v in the visible wavelength range and respective average optical reflectances R3ir and R1ir in the infrared wavelength range, R1v<R3v and R1ir-R3ir>10%, when the incident light is polarized along an in-plane first direction; and for the visible wavelength range and for a second incident angle of greater than about 40 degrees, the plurality of polymeric second layers has an average optical reflectance R2v(x) when the incident plane comprises the first direction and an average optical reflectance R2v(y) when the incident plane comprises an in-plane second direction orthogonal to the first direction, 5%<R2v(y) <R2v(x)<60%.

2. The reflective polarizer of claim 1, wherein R1v is less than R3v by at least 2.5%.

3. The reflective polarizer of claim 1, wherein R2v (y) is less than R2v (x) by at least 2.5%.

4. The reflective polarizer of claim 1, wherein the inorganic material comprises an electrically conductive material.

5. The reflective polarizer of claim 1, wherein the inorganic material comprises one or more of a dielectric material and a dielectric oxide material.

6. The reflective polarizer of claim 1, wherein the plurality of first layers comprises a plurality of alternating A-layers and B-layers numbering N1 in total, and the plurality polymeric second layers comprises a plurality of alternating polymeric C-layers and polymeric D-layers numbering N2 in total, 2<N1<50, N2-N1>10, wherein each of the A-through D-layers has an average thickness of less than about 500 nm.

7. The reflective polarizer of claim 6, wherein each of the A-layers, but none of the B-layers, is electrically conductive along at least one in-plane direction of the A-layer.

8. The reflective polarizer of claim 7, wherein each of the A-layers, but none of the B-layers, is patterned to form an electrically conductive mesh comprising a plurality of electrically conductive traces connected to define a plurality enclosed open areas therebetween.

9. A windshield of a vehicle comprising the reflective polarizer of claim 1.

10. The windshield of claim 9, wherein the plurality of first layers faces an exterior of the vehicle and the plurality of polymeric second layers faces an interior of the vehicle.

11. The windshield of claim 9, wherein the reflective polarizer is sandwiched between a pair of substrates.

12. The windshield of claim 9, wherein at least some of the first layers in the reflective polarizer are electrically conductive, and wherein the electrically conductive first layers are electrically connected to a power source configured to pass an electric current through the electrically conductive first layers to heat the windshield.

13. The reflective polarizer of claim 1, wherein the first and second incident angles are about 8 degrees and 60 degrees, respectively.

14. The reflective polarizer of claim 8, wherein the electrically conductive meshes of the A-layers are aligned with each other so that from a plan top view, a percent open area of the plurality of first layers is substantially equal to a percent open area of each of the electrically conductive meshes of the A-layers.

15. The reflective polarizer of claim 8, wherein a percent open area of the electrically conductive mesh is greater than about 70%.

16. The reflective polarizer of claim 1, wherein an average thickness of the plurality of first layers is less than about 50 microns.

\* \* \* \* \*